(12) United States Patent
Fudaba et al.

(10) Patent No.: US 9,335,752 B2
(45) Date of Patent: May 10, 2016

(54) CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

(71) Applicant: Panasonic Corporation, Osaka (JP)

(72) Inventors: Yudai Fudaba, Osaka (JP); Yuko Tsusaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/474,613

(22) Filed: Sep. 2, 2014

(65) Prior Publication Data

US 2015/0073595 A1   Mar. 12, 2015

(30) Foreign Application Priority Data

Sep. 6, 2013   (JP) .................................. 2013-185389

(51) Int. Cl.
| | |
|---|---|
| *G05B 15/00* | (2006.01) |
| *G05B 15/02* | (2006.01) |
| *B25J 3/04* | (2006.01) |
| *B25J 9/16* | (2006.01) |

(52) U.S. Cl.
CPC . *G05B 15/02* (2013.01); *B25J 3/04* (2013.01); *B25J 9/1689* (2013.01); *Y10S 901/08* (2013.01); *Y10S 901/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,855,553 | A * | 1/1999 | Tajima | A61B 19/22 600/407 |
| 6,374,255 | B1 * | 4/2002 | Peurach | G06F 3/016 |
| 6,424,885 | B1 * | 7/2002 | Niemeyer | A61B 19/22 600/109 |
| 6,958,752 | B2 * | 10/2005 | Jennings, Jr. | G06T 19/20 345/419 |
| 7,831,292 | B2 * | 11/2010 | Quaid | A61B 19/2203 345/156 |
| 8,010,180 | B2 * | 8/2011 | Quaid | A61B 17/1764 600/424 |
| 2004/0111183 | A1 * | 6/2004 | Sutherland | A61B 19/22 700/245 |

(Continued)

FOREIGN PATENT DOCUMENTS

| | | |
|---|---|---|
| JP | 61-33878 | 2/1986 |
| JP | 8-187246 | 7/1996 |

*Primary Examiner* — Jonathan L Sample
(74) *Attorney, Agent, or Firm* — Wenderoth, Lind & Ponack, L.L.P.

(57) ABSTRACT

A control apparatus for a master slave robot causes a force information correcting unit to correct force information in accordance with a feature of a target object on a screen from target object information calculated by a target object information calculation unit. An operator can thus apply appropriate force while watching a picture projected on a display to perform a task.

15 Claims, 41 Drawing Sheets

(56) References Cited

U.S. PATENT DOCUMENTS

| | | | | |
|---|---|---|---|---|
| 2008/0004634 A1* | 1/2008 | Farritor | A61B 1/00158 | 606/130 |
| 2008/0013958 A1* | 1/2008 | Katsuki | H04B 10/1143 | 398/130 |
| 2009/0248037 A1* | 10/2009 | Prisco | A61B 19/2203 | 606/130 |
| 2010/0168918 A1* | 7/2010 | Zhao | A61B 19/2203 | 700/259 |
| 2010/0169815 A1* | 7/2010 | Zhao | A61B 19/2203 | 715/771 |
| 2011/0208355 A1* | 8/2011 | Tsusaka | B25J 9/1664 | 700/246 |
| 2011/0306986 A1* | 12/2011 | Lee | A61B 19/2203 | 606/130 |
| 2012/0190981 A1* | 7/2012 | Harris | A61B 19/2203 | 600/439 |
| 2013/0310977 A1* | 11/2013 | Tsusaka | B25J 9/1656 | 700/257 |
| 2014/0330073 A1* | 11/2014 | Ko | A61B 19/2203 | 600/103 |
| 2015/0073595 A1* | 3/2015 | Fudaba | B25J 3/04 | 700/259 |

* cited by examiner

Fig. 3

| TIME (msec) | POSITION (mm) (x, y, z) | ORIENTATION (rad) (r$_x$, r$_y$, r$_z$) | VELOCITY (mm/msec) (v$_x$, v$_y$, v$_z$) | ANGULAR VELOCITY (rad/msec) ($\omega_x$, $\omega_y$, $\omega_z$) |
|---|---|---|---|---|
| ... | ... | ... | ... | ... |
| 1821 | 112.2, 65.5, -8.5 | 0.07, -0.87, 1.22 | 0.11, -0.21, 0.38 | 0.015, -0.012, 0.010 |
| 1822 | 113.1, 64.8, -8.5 | 0.06, -0.85, 1.27 | 0.95, -0.73, 0.00 | -0.018, 0.022, 0.059 |
| 1823 | 113.5, 64.0, -8.0 | 0.05, -0.82, 1.28 | 0.42, -0.82, 0.50 | -0.010, 0.026, 0.017 |
| ... | ... | ... | ... | ... |

*Fig.7*

| TIME (msec) | MAGNIFICATION PERCENTAGE | POSITION (mm) (x, y, z) | ORIENTATION (rad) ($r_x$, $r_y$, $r_z$) |
|---|---|---|---|
| ⋮ | ⋮ | ⋮ | ⋮ |
| 2244 | 4.0 | 180.0, 25.5, -18.5 | 0.12, -0.55, 1.01 |
| 2245 | 4.0 | 180.4, 25.5, -18.5 | 0.11, -0.53, 1.01 |
| 2246 | 4.0 | 180.4, 25.2, -18.0 | 0.10, -0.52, 1.03 |
| ⋮ | ⋮ | ⋮ | ⋮ |

Fig.8

| TIME (msec) | MAGNIFICATION PERCENTAGE | POSITION (mm) (x, y, z) | ORIENTATION (rad) ($r_x$, $r_y$, $r_z$) |
|---|---|---|---|
| ⋮ | ⋮ | ⋮ | ⋮ |
| 5544 | 1.5 | 70.0, 25.5, -18.5 | 0.32, -0.35, 1.01 |
| 5545 | 1.5 | 72.4, 22.5, -21.5 | 0.31, -0.33, 1.10 |
| 5546 | 4.0 | 73.4, 22.2, -21.0 | 0.30, -0.32, 1.11 |
| ⋮ | ⋮ | ⋮ | ⋮ |

*Fig.10*

| TIME (msec) | POSITION (mm) (x, y, z) | ORIENTATION (rad) ($r_x$, $r_y$, $r_z$) |
|---|---|---|
| ⋮ | ⋮ | ⋮ |
| 356 | 0.11, -0.21, 0.00 | 0.015, -0.012, 0.010 |
| 357 | 0.21, -0.20, 0.03 | 0.015, -0.022, 0.010 |
| 358 | 0.33, -0.21, 0.10 | 0.015, -0.026, 0.015 |
| ⋮ | ⋮ | ⋮ |

Fig.11

| TIME (ms) | BRIGHTNESS |
|---|---|
| ⋮ | ⋮ |
| 1272 | 5 |
| 1273 | 5 |
| 1274 | 5 |
| ⋮ | ⋮ |

| TIME (ms) | FORCE (N or Nm) ($F_x$, $F_y$, $F_z$, $M_x$, $M_y$, $M_z$) |
|---|---|
| ⋮ | ⋮ |
| 2005 | 0.55, 1.22, -2.11, 0.012, 0.021, 0.031 |
| 2006 | 0.57, 1.25, -2.20, 0.012, 0.022, 0.034 |
| 2007 | 0.55, 1.27, -2.30, 0.013, 0.021, 0.033 |
| ⋮ | ⋮ |

| REFERENCE PICTURE INFORMATION | MATERIAL INFORMATION |
|---|---|
|  | 1 (ALUMINUM) |
|  | 2 (SPONGE) |
|  | 3 (COTTON) |

Fig.21

| TIME (ms) | MATERIAL INFORMATION |
|---|---|
| ⋮ | ⋮ |
| 877 | 2 |
| 878 | 2 |
| 879 | 2 |
| ⋮ | ⋮ |

Fig.22

| MATERIAL INFORMATION | CORRECTED INFORMATION |
|---|---|
| 1 (ALUMINUM) | 1.0 |
| 2 (SPONGE) | 0.3 |
| 3 (COTTON) | 0.2 |

WHEN INSERTION PORT APPEARS
TO BE MADE OF ALUMINUM

WHEN INSERTION PORT APPEARS
TO BE MADE OF SPONGE

WHEN INSERTION PORT APPEARS
TO BE MADE OF COTTON

Fig.28

| TIME (ms) | ASSEMBLING WORKLOAD INFORMATION (mm) |
|---|---|
| ⋮ | ⋮ |
| 1441 | 5 |
| 1442 | 5 |
| 1443 | 5 |
| ⋮ | ⋮ |

CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

BACKGROUND OF THE INVENTION

The technical field relates to a control apparatus and a control method for a master slave robot, a robot, a control program for the master slave robot, and an integrated electronic circuit for control of the master slave robot, each of which generates motion of the master slave robot.

A master slave robot has been attracting attention in various fields. Such a master slave robot includes a master robot that is manipulated remotely by a person to cause a slave robot to perform a task.

In endoscopic surgery at a medical site, a surgeon remotely manipulates a master robot while being watching an endoscope motion picture projected on a monitor screen and moves a forceps gripped by a slave robot to conduct the surgery. There are an effect that the surgery can be conducted while an enlarged picture of an affected part or the forceps being projected on the monitor screen as well as an effect that the surgery can be conducted remotely by an expert surgeon who is not at the site.

There has been also proposed a master slave robot for a manufacturing site, and such a master slave robot includes a slave robot that is remotely operated or taught to perform a fine task or a skilled task. The master slave robot is capable of easily performing such a fine task particularly under a microscope thanks to enlarged display around a hand, enlargement or reduction in shift amount of hand operation, or the like.

Both of these master slave systems are required to have a function of smoothly operating the slave robot in accordance with the operated master robot, as well as a function of feeding back force applied to the slave robot, to the master robot.

A person manipulates the master robot while watching the monitor screen. The motion picture projected on the monitor thus needs to match operation of the master robot as well as motion of the slave robot. There has been proposed the following technique achieving the match.

A master slave manipulator for body cavity surgery automatically adjusts a motion ratio between a master robot and a slave robot in accordance with a magnification percentage of a motion picture projected on a monitor (see Patent Literature

CITATION LIST

Patent Literature

[Patent Literature 1] Japanese Unexamined Patent Publication No. 8-187246

SUMMARY OF THE INVENTION

More improvement in work efficiency has been demanded so that presented force can match the motion picture watched by a person and the person can perform the task accurately.

One non-limiting and exemplary embodiment provides a control apparatus and a control method for a master slave robot, a robot, a control program for the master slave robot, and an integrated electronic circuit for control of the master slave robot, in which the master slave robot is manipulated by an operator who is watching a motion picture, and enables the operator to perform a task efficiently even when appearance is changed on a screen.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A control apparatus for a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit, the control apparatus comprising:

a force information acquiring unit that acquires force information on force externally applied to the slave arm;

a target object information calculation unit that calculates target object information including at least one of a color depth of the target object, a material of the target object, and an assembling workload to the target object of the assembly task at the display unit displaying the assembly task;

a force information correcting unit that corrects the force information acquired from the force information acquiring unit in accordance with the target object information acquired from the target object information acquiring unit, to generate corrected force information; and a force information presentation unit that presents, to the master slave robot, the corrected force information generated by the force information correcting unit.

These general and specific aspects may be implemented using a system, a method, and a computer program, and any combination of systems, methods, and computer programs.

According to the above aspect of the present disclosure, even when how a motion picture appears on a screen changes in the master slave robot manipulated by an operator watching the motion picture, presented force can match the watched motion picture. The operator can be thus guided to apply force necessary for the task to perform the task efficiently and accurately.

BRIEF DESCRIPTION OF THE DRAWINGS

These and other aspects and features of the present disclosure will become clear from the following description taken in conjunction with the embodiments thereof with reference to the accompanying drawings, in which:

FIG. 3 is a view showing data of motion information and time information on the master slave robot according to the first embodiment of the present disclosure;

FIG. 7 is a view showing data of magnification percentage information, imaging device position information, and time information on the master slave robot according to the first embodiment of the present disclosure;

FIG. 8 is a view showing data of magnification percentage information, imaging device position information, and time information on the master slave robot according to the first embodiment of the present disclosure (when the magnification percentage information varies)

FIG. 10 is a view showing data of corrected master motion information and time information on the master slave robot according to the first embodiment of the present disclosure;

FIG. 11 is a view showing data of target object information and time information on the master slave robot according to the first embodiment of the present disclosure;

FIG. 21 is a view showing data of target object information and time information on the master slave robot according to the second embodiment of the present disclosure;

FIG. 22 is a view showing data of material information and corrected information on the master slave robot according to the second embodiment of the present disclosure;

FIG. 28 is a view showing data of target object information and time information on the master slave robot according to the third embodiment of the present disclosure;

DETAILED DESCRIPTION

Hereinbelow, the detailed description of the embodiments of the present disclosure will be done with reference to the drawings.

Prior to the detailed description of the embodiments of the present disclosure with reference to the drawings, finding as the basis of the present disclosure is described initially and various aspects of the present disclosure are described subsequently.

The embodiments of the present disclosure relate to an assembly task.

The "assembly task" in this description includes inserting an inserted object gripped by a slave arm to a receiving object to be inserted, locating a target object gripped by a slave arm on a surface of another target object, or the like.

(Finding as Basis of the Invention)

Figure 1:
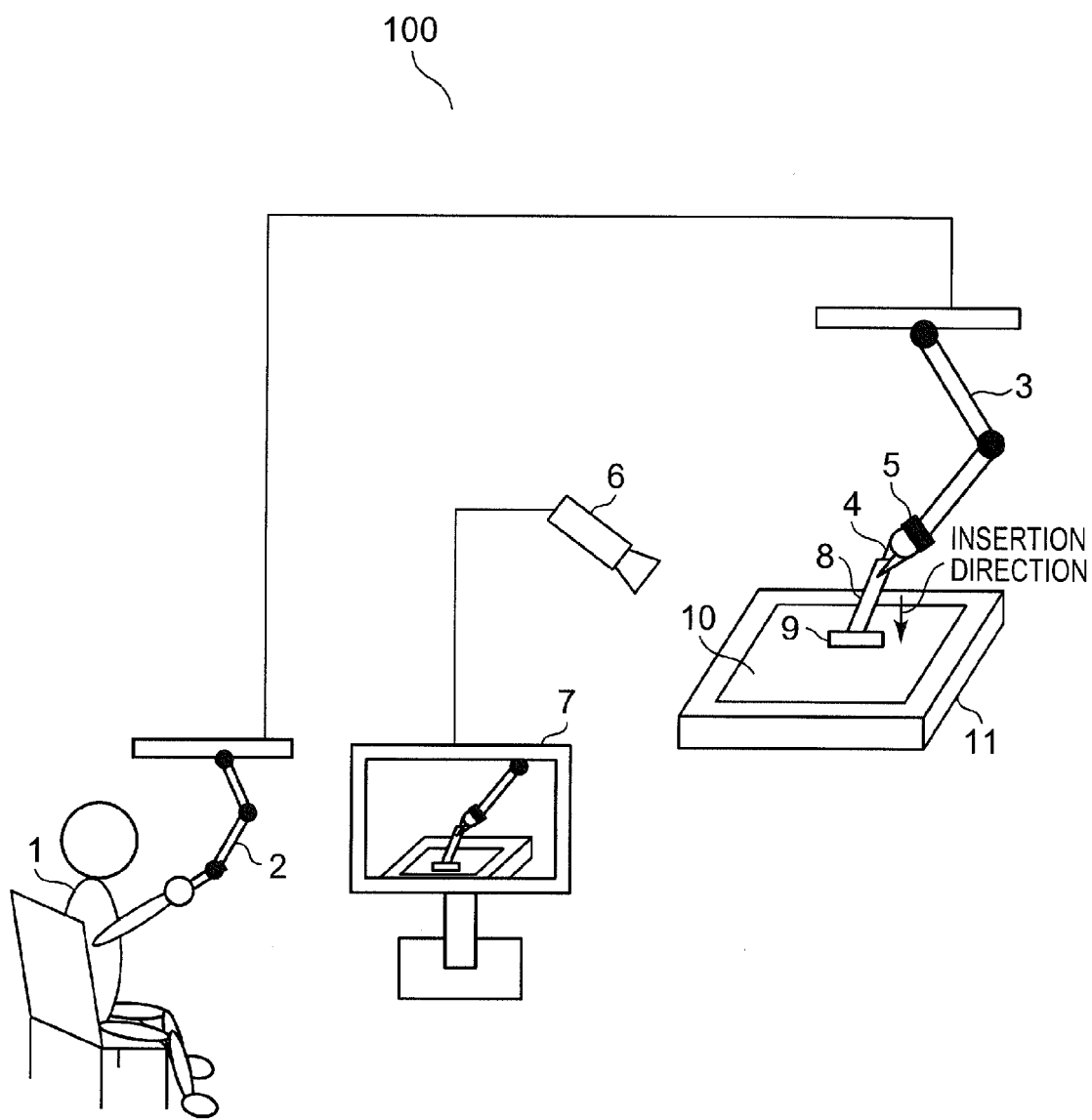
FIG. 1 is a view showing a schematic configuration of a master slave robot according to a first embodiment of the present disclosure.

FIG. 1 shows a slave arm 3 that functions as a robot for performing a task of inserting a fine component 8 gripped by a hand 4 to an insertion port 9 of an instrument 10 provided on a workbench 11. This task is imaged by an imaging device 6 such as a camera and is projected on a display 7 that exemplifies a display unit. FIG. 1 shows a master slave robot 100 including a master arm 2 that is manipulated by an operator (person) 1 who is watching a motion picture projected on the display 7 under such a condition. Change in motion ratio of the slave arm 3 to a magnification percentage of the motion picture in the master slave robot 100 causes change of the formerly watched motion picture and manipulation of the master arm 2 or how force is sensed, so that work efficiency deteriorates.

Figure 42A:
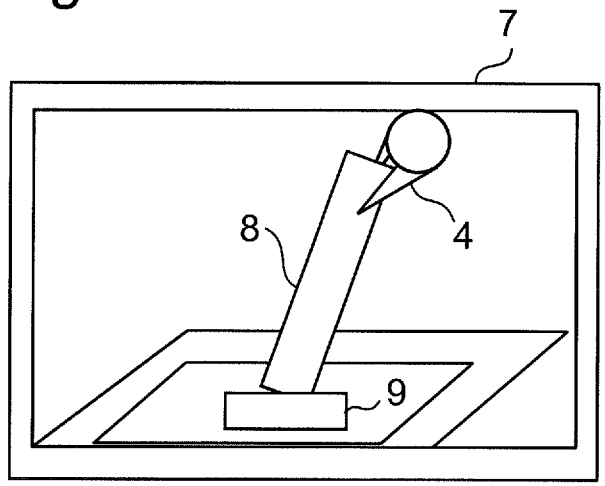
FIG. 42A is an explanatory view of a motion picture and how force is sensed in a conventional master slave robot.
Figure 42B:
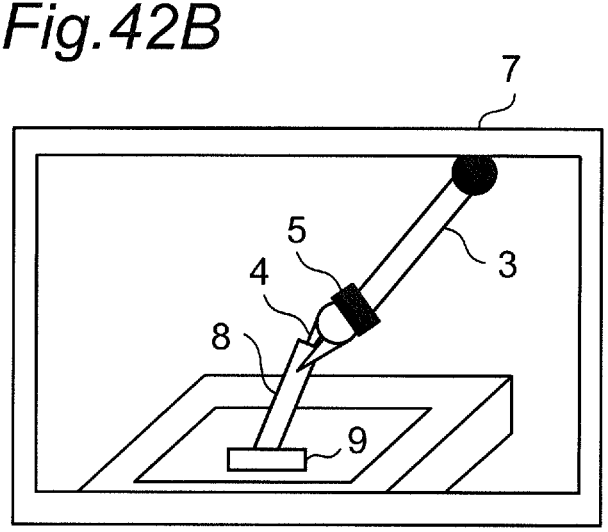
FIG. 42B is an explanatory view of a motion picture and how force is sensed in a conventional master slave robot.

Such a phenomenon is described with reference to FIGS. 42A and 42E. FIGS. 42A and 42B each show a motion picture on a screen of the display 7 watched by the operator 1 in the master slave robot 100 shown in FIG. 1. FIG. 42A is larger in magnification percentage of the motion picture than FIG. 42B and shows the on-screen fine component 8 and the like that are larger than the actual components. When watching a target object, a person typically tends to determine with prejudice that a target object having a large volume is heavier (the Charpentier effect (size-weight illusion)). The target object appears in a larger size in a motion picture of a larger magnification percentage, and the person regards the target object as being heavier. Even when performing a task to an identical target object, the person thus determines that the target object in a motion picture of a larger magnification percentage is heavier and applies larger force to the target object. The operator 1 applies an excessive load to the target object and is thus hard to perform the task accurately. Proposed in view of this problem is a technique that matches a motion picture watched by the operator 1 to manipulation of the operator 1.

Specifically, in the method according to Patent Literature 1, the motion ratio of the slave arm 3 to the master arm 2 is automatically adjusted in accordance with the magnification percentage of the motion picture projected on the display 7. For example, when the magnification percentage is increased by k times, the motion ratio is changed to 1/k.

However, in the method according to Patent Literature 1, the motion ratio is changed in accordance with the magnification percentage of the motion picture whereas magnitude of force fed back to the operator 1 is not changed. In short, Patent Literature 1 fails to take into consideration change of how the operator 1 senses fed back force depending on how the motion picture appears. In the examples shown in FIGS. 42A and 42B, the operator 1 disadvantageously performs a task with larger force when the motion picture is enlarged.

The master slave robot 100 thus needs to be controlled to automatically adjust fed back force in accordance with the motion picture projected on the display 7 so that the operator 1 is capable of manipulating the master arm 2 in accordance with the motion picture.

The problem of such difference of how force is sensed applies to the case where a magnification percentage is changed as well as to a case where a feature (feature quantity), such as a color depth, a material, or a buried amount, of the target object is changed on the screen watched by the operator 1. The master slave robot 100 thus needs to be controlled to automatically adjust fed back force in accordance with the feature of the target object projected on the screen so that the operator 1 is capable of performing the task accurately while watching the screen on the display 7.

The present disclosure includes the various aspects described below.

The present disclosure includes the various aspects described below.

1st aspect: A, control apparatus for a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit, the control apparatus comprising:

a force information acquiring unit that acquires force information on force externally applied to the slave arm;

a target object information calculation unit that calculates target object information on a color depth of the target object of the assembly task at the display unit displaying the assembly task;

a force information correcting unit that corrects the force information acquired from the force information acquiring unit in accordance with the target object information acquired from the target object information acquiring unit, to generate corrected force information; and a force information presentation unit that presents, to the master slave robot, the corrected force information generated by the force information correcting unit.

This aspect achieves correction of the force information on fed back force according to the target object information on the color depth, the material, the assembling workload, or the like of the target object. Even when the feature of the target object (the feature quantity of the target object information) changes, particularly when how a motion picture appears on a screen changes in the master slave robot manipulated by an operator watching the motion picture, presented force can match the watched motion picture. The operator can be thus guided to apply force necessary for the task to perform the task efficiently and accurately.

2nd aspect: The control apparatus for the master slave robot according to the 1st aspect, wherein the force information correcting unit generates the corrected force information by correcting the force information acquired from the force information acquiring unit such that the force information is increased as the target object information on the color depth of the target object acquired from the target object information calculation unit indicates a deeper color.

This aspect achieves correction of the force information in accordance with the color depth of the target object. The operator can be thus guided to perform the task with appropriate force even when the color depth of the target object is changed.

3rd aspect: The control apparatus for the master slave robot according to the 1st aspect, wherein the force information correcting unit generates the corrected force information by correcting the force information acquired from the force information acquiring unit such that the force information is decreased as the target object information indicates the softer material of the target object acquired from the target object information calculation unit.

This aspect achieves correction of the force information in accordance with how the material of the target object appears. The operator can be thus guided to perform the task with appropriate force even when how the material of the target object appears is changed.

4th aspect: The control apparatus for the master slave robot according to the 1st aspect, wherein the force information correcting unit generates the corrected force information by correcting the force information acquired from the force information acquiring unit such that the force information is decreased as the target object information indicates the larger assembling workload to the target object acquired from the target object information calculation unit.

This aspect achieves correction of the force information in accordance with the assembling workload to the target object. The operator can be thus guided to perform the task with appropriate force even when the assembling workload to the target object is changed.

5th aspect: The control apparatus for the master slave robot according to the 1st aspect, further comprising a target object information selector that selects, when acquiring a plurality of target object information pieces from the target object information calculation unit, one of the plurality of target object information pieces.

According to this aspect, when the target object has a plurality of features, the most influential feature of the target object is selected and the force information is corrected. This achieves effective correction of the force information and the operator can be thus guided to perform the task accurately.

6th aspect: The control apparatus for the master slave robot according to the 1st aspect, further comprising a target object information synthesizing unit that synthesizes, when acquiring a plurality of target object information pieces from the target object information calculation unit, the plurality of target object information pieces into a single target object information piece.

According to this aspect, when the target object has a plurality of features, the plurality of target object information pieces are synthesized and the force information is corrected. This achieves correction of the force information in accordance with all of the target object information pieces and the operator can be thus guided to perform the task accurately.

7th aspect: The control apparatus for the master slave robot according to the 1st aspect, further comprising:

a displayed information acquiring unit that acquires magnification percentage information on a picture at the display unit displaying the assembly task; wherein the force information correcting unit increases a corrected amount for correction of the force information acquired from the force information acquiring unit as the magnification percentage information acquired from the displayed information acquiring unit is larger.

This aspect achieves correction of the force information in accordance with the magnification percentage information. The force information can be corrected in accordance with how the target object actually appears to the operator and the operator can be thus guided to perform the task accurately.

8th aspect: The control apparatus for the master slave robot according to the 7th aspect, wherein the displayed information acquiring unit calculates, as the magnification percentage information, a magnification percentage for enlarged display of a state of the task by the slave arm on a screen of the display unit, and the force information correcting unit generates the corrected force information by correcting the force information in accordance with the calculated magnification percentage information.

According to this aspect, the state of the task of the slave arm is enlarged and the magnification percentage information is calculated. This achieves calculation of the magnification percentage information appropriate for the actual task and correction of the force information to an appropriate value. The operator can be thus guided to apply force appropriate for the task.

9th aspect: The control apparatus for the master slave robot according to the 1st aspect, wherein the force information correcting unit corrects, when updating the force information in a predetermined period for correction of the force information, a period for updating the force information by extending or shortening the predetermined period.

According to this aspect, magnitude of the force information is not changed by correction, so that the force information can be prevented from increasing too much. Even with a system that cannot correct magnitude of force information, it is possible to achieve an effect similar to that of correcting the magnitude of the force information.

10th aspect: The control apparatus for the master slave robot according to any one of The 1st to 9th aspects, wherein
the target object information calculation unit refers to correlation information between the task and a material of the target object or an assembling workload to the target object in accordance with identification information on the task, and calculates a material of the target object or an assembling workload to the target object.

This aspect achieves calculation of the material of or the assembling workload to the target object from the identification information, and thus achieves accurate calculation of the information. This achieves correction of the force information to an appropriate value and the operator can be guided to apply, to the target object, force appropriate for the task.

11th aspect: A robot comprising:
the control apparatus for a master slave robot according to any one of the 1st to 10th aspects; and the master slave arm.

This aspect achieves correction of the force information on fed back force according to the target object information on the color depth, the material, the assembling workload, or the like of the target object. Even when the feature of the target object (the target object information) changes, particularly when how a motion picture appears on a screen changes in the master slave robot manipulated by an operator watching the motion picture, presented force can match the watched motion picture. The operator can be thus guided to apply force necessary for the task to perform the task efficiently and accurately.

12th aspect: A method of controlling a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit,
the method comprising:
acquiring, by a force information acquiring unit, force information on force externally applied to the slave arm;
calculating, by a target object information calculation unit, target object information on a color depth of the target object, a material of the target object, and an assembling workload to the target object of the assembly task at the display unit displaying the assembly task;
correcting, by a force information correcting unit, the force information acquired from the force information acquiring unit in accordance with the target object information acquired from the target object information acquiring unit, to generate corrected force information; and
presenting to the master slave robot, by a force information presentation unit, the corrected force information generated by the force information correcting unit.

This aspect achieves correction of the force information on fed back force according to the target object information on the color depth, the material, the assembling workload, or the like of the target object. Even when the feature of the target object (the target object information) changes, particularly when how a motion picture appears on a screen changes in the master slave robot manipulated by an operator watching the motion picture, presented force can match the watched motion picture. The operator can be thus guided to apply force necessary for the task to perform the task efficiently and accurately.

13th aspect: A control program for a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit,
the program causing a computer to execute the steps of:
acquiring, by a force information acquiring unit, force information on force externally applied to the slave arm;
calculating, by a target object information calculation unit, target object information on a color depth of the target object, a material of the target object, and an assembling workload to the target object of the assembly task at the display unit displaying the assembly task;
correcting, by a force information correcting unit, the force information acquired from the force information acquiring unit in accordance with the target object information acquired from the target object information acquiring unit, to generate corrected force information; and
presenting to the master slave robot, by a force information presentation unit, the corrected force information generated by the force information correcting unit.

This aspect achieves correction of the force information on fed back force according to the target object information on the color depth, the material, the assembling workload, or the like of the target object. Even when the feature of the target object (the target object information) changes, particularly when how a motion picture appears on a screen changes in the master slave robot manipulated by an operator watching the motion picture, presented force can match the watched motion picture. The operator can be thus guided to apply force necessary for the task to perform the task efficiently and accurately.

14th aspect: An integrated electronic circuit for control of a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit,
the integrated electronic circuit comprising:
a force information acquiring unit configured to acquire force information on force externally applied to the slave arm;
a target object information calculation unit configured to calculate target object information on a color depth of the target object, a material of the target object, and an assembling workload to the target object of the assembly task at the display unit displaying the assembly task;
a force information correcting unit configured to correct the force information acquired from the force information acquiring unit in accordance with the target object information acquired from the target object information acquiring unit, to generate corrected force information; and a force information presentation unit configured to present, to the master slave robot, the corrected force information generated by the force information correcting unit.

This aspect achieves correction of the force information on fed back force according to the target object information on the color depth, the material, the assembling workload, or the like of the target object. Even when the feature of the target object (the target object information) changes, particularly when how a motion picture appears on a screen changes in the master slave robot manipulated by an operator watching the motion picture, presented force can match the watched motion picture. The operator can be thus guided to apply force necessary for the task to perform the task efficiently and accurately.

First Embodiment

Schematically described is a master slave robot 100 including a control apparatus 101 for the master slave robot 100 according to the first embodiment of the present disclosure.

FIG. 1 shows a task of inserting a fine component 8 using the master slave robot 100.

FIG. 1 exemplifies a task of attaching the fine component 8 as an example of a target object, to an insertion port 9 as another example of a target object, of a connector for an instrument 10 such as a television, a DVD recorder, or a mobile phone in cell production at a plant.

The master slave robot 100 includes a slave arm 3 functioning as a robot that is located on a workbench 11 or a wall surface where the instrument 10 is provided and performs the task of inserting the fine component 8 to the insertion port 9 of the instrument 10.

The slave arm 3 has the distal end to which a hand 4 for gripping the fine component 8 is attached.

The workbench 11 is provided with an imaging device 6 such as a camera for imaging the fine component 8 and the insertion port 9 in an enlarged state, and a display 7 projects the imaged motion picture.

A force sensor 5 is provided at the wrist of the hand 4 and measures reactive force generated when the fine component 8 is in contact with the insertion port 9 or the instrument 10.

The slave arm 3 moves when an operator 1 manipulates the master arm 2 while checking on the display 7 the motion picture imaged by the imaging device 6. Furthermore, force measured by the force sensor 5 is fed back from the slave arm 3 to the master arm 2, so that the operator 1 is capable of operating the slave arm 3 as if directly manipulating the fine component 8.

Figure 2:
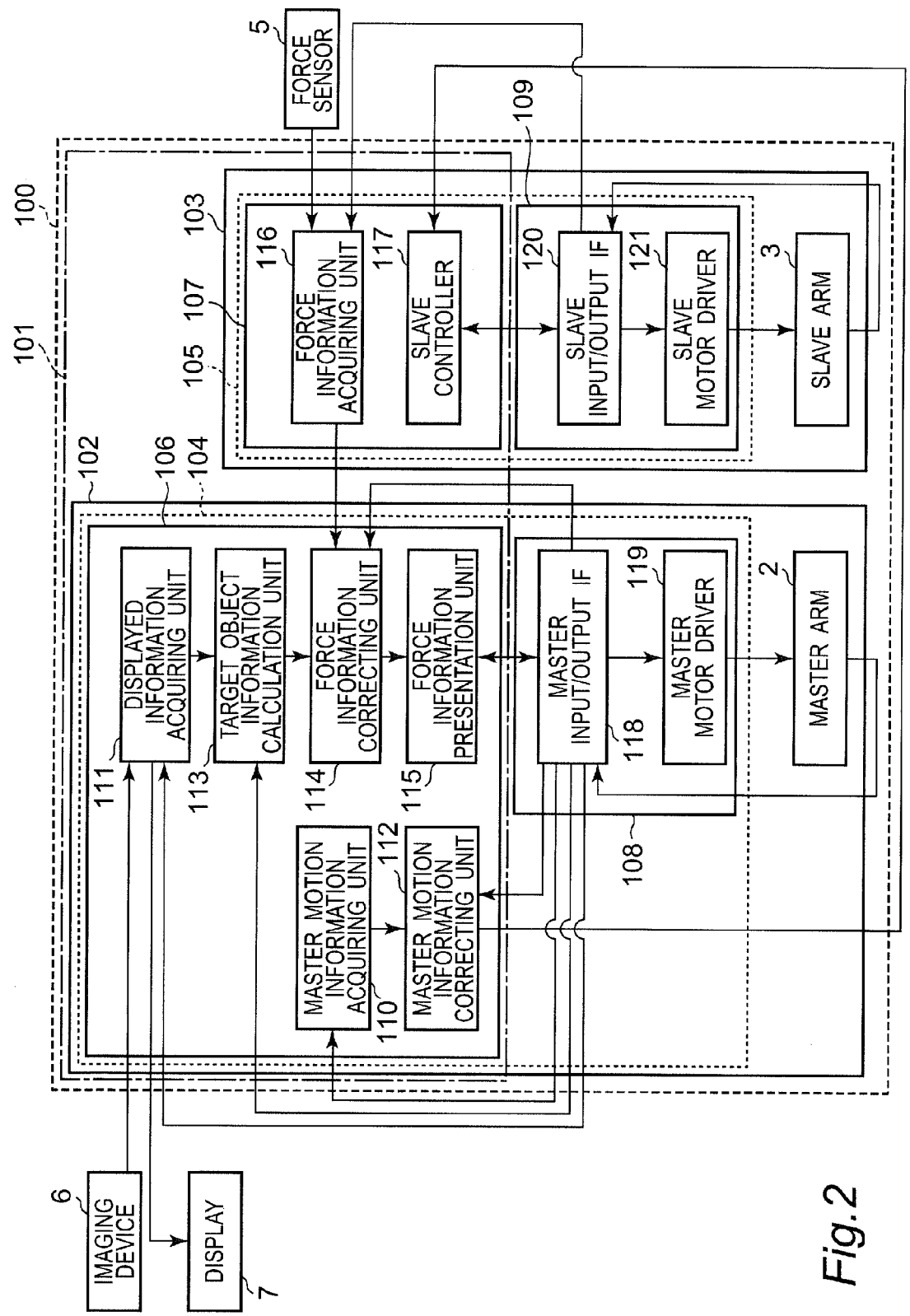
FIG. 2 is a block diagram of the master slave robot according to the first embodiment of the present disclosure.

FIG. 2 is a block diagram of the master slave robot 100 according to the first embodiment of the present disclosure. In FIG. 2, the master slave robot 100 includes a master robot 102 and a slave robot 103. The master robot 102 includes the master arm 2 and a control apparatus 104 for the master arm 2. The slave robot 103 includes the slave arm 3 and a control apparatus 105 for the slave arm 3.

The control apparatus 104 for the master arm 2 generates motion of the slave arm 3 and corrects force information acquired by the slave robot 103 to present the corrected force information. The control apparatus 105 for the slave arm 3 controls a position and an orientation of the slave arm 3.

The first embodiment is described in detail below.

<Description of Control Apparatus for Master Arm>

The control apparatus 104 for the master arm 2 includes a master control apparatus main body 106 and a master peripheral device 108.

<Description of Control Apparatus for Slave Arm>

The control apparatus 105 for the slave arm 3 includes a slave control apparatus main body 107 and a slave peripheral device 109.

<Description of Master Control Apparatus Main Body>

The master control apparatus main body 106 includes a master motion information acquiring unit 110, a displayed information acquiring unit ill, a master motion information correcting unit 112, a target object information calculation unit 113, a force information correcting unit 114, and a force information presentation unit 115.

(Master Motion Information Acquiring Unit 110)

The master motion information acquiring unit 110 receives position information and orientation information on the master arm 2 from a master input/output IF 118, and time information from a timer incorporated in the master input/output IF 118. The master motion information acquiring unit 110 acquires velocity information by differentiating the position information with respect to the time information, which are received from the master input/output IF 118. The master motion information acquiring unit 110 acquires angular velocity information by differentiating the orientation information with respect to the time information. FIG. 3 indicates the time information, the position information, the orientation information, the velocity information, and the angular velocity information, which are acquired by the master motion information acquiring unit 110. The position information, the orientation information, the velocity information, and the angular velocity information configure motion information (master motion information) on the master arm 2.

The master motion information acquiring unit 110 transmits the position information, the orientation information, the velocity information, and the angular velocity information on the master arm 2, as well as the time information thus acquired, to the master motion information correcting unit 112.

(Imaging Device 6)

Figure 4A:
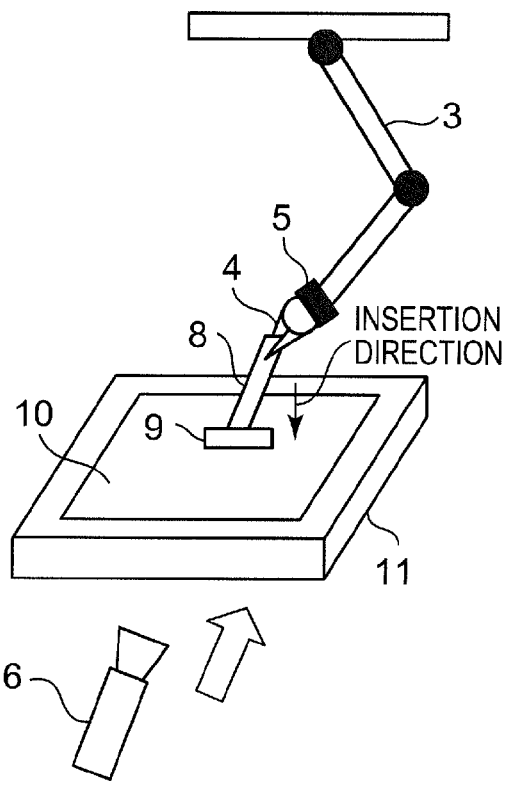
FIG. 4A is an explanatory view of how to locate an imaging device in the master slave robot according to the first embodiment of the present disclosure.
Figure 4B:
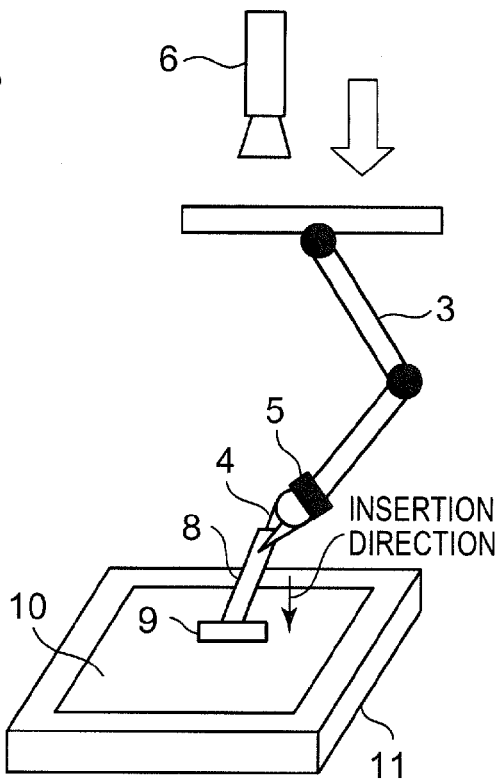
FIG. 4B is an explanatory view of how to locate an imaging device in the master slave robot according to the first embodiment of the present disclosure.
Figure 4C:
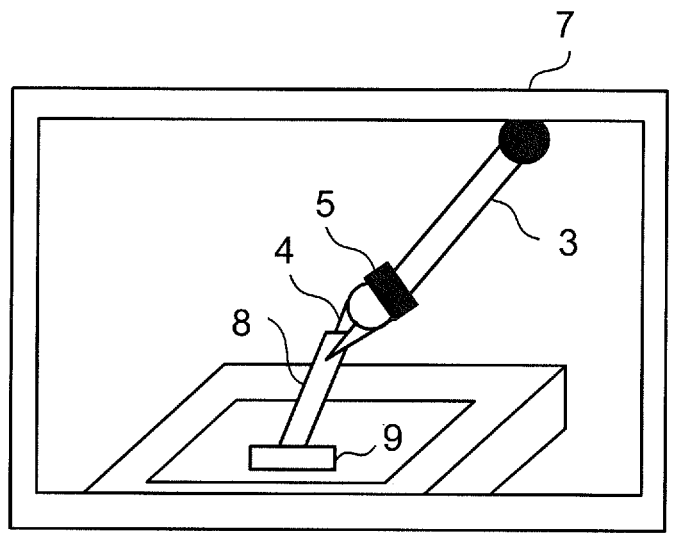
FIG. 4C is an explanatory view of how to locate an imaging device in the master slave robot according to the first embodiment of the present disclosure.
Figure 4D:
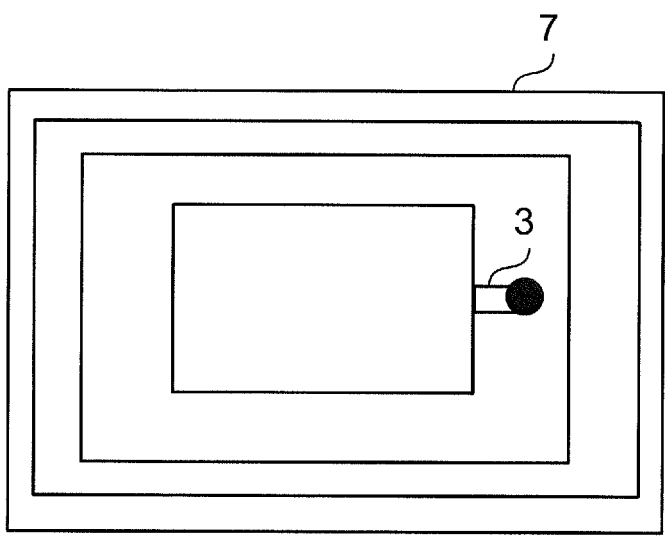
FIG. 4D is an explanatory view of how to locate an imaging device in the master slave robot according to the first embodiment of the present disclosure.

The imaging device 6 images a task performed by the slave arm 3, more specifically, images mainly the hand 4, the fine component 8, the insertion port 9, and the vicinities thereof. The imaging device 6 is capable of changing a magnification percentage for imaging. The imaging device 6 can be also changed in location or orientation thereof. The imaging device 6 can be located at any position or in any orientation, although the imaging device 6 needs to be located at a position and in an orientation so that imaging targets (particularly the hand 4, the fine component 8, and the insertion port 9) are not overlapped and shift and the sizes of the imaging targets are visible in the imaged picture. In the examples shown in FIGS. 4A and 4B, the imaging targets are not overlapped and shift thereof is also visible in the imaged picture in the position and the orientation of FIG. 4A rather than the position and the orientation of FIG. 4B. FIGS. 4C and 4D each show a motion picture projected on the display 7. According to these pictures, shift of the slave arm 3 and the size of the fine component 8 are more visible on the screen in the position and the orientation of FIG. 4A.

Figure 5:
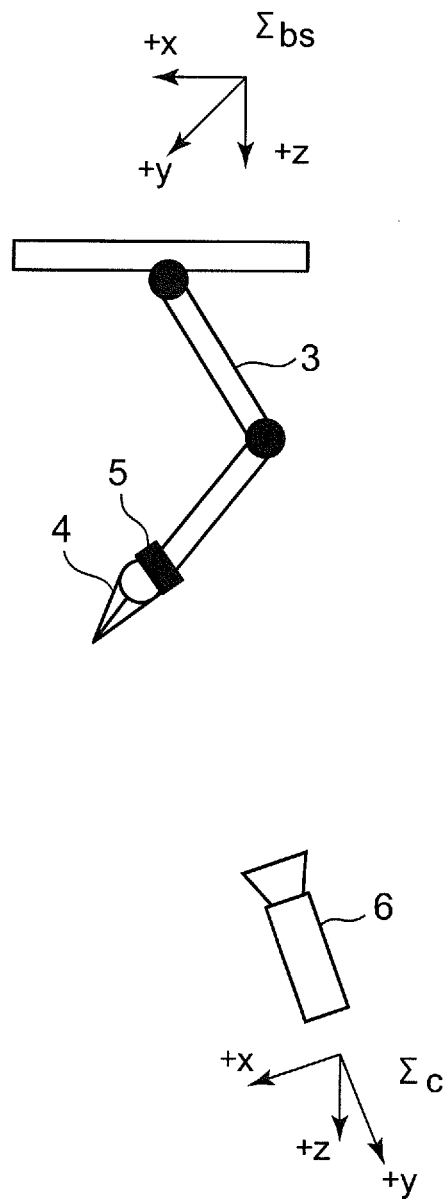
FIG. 5 is an explanatory view of a coordinate system of the imaging device in the master slave robot according to the first embodiment of the present disclosure.

The imaging device 6 transmits, to the displayed information acquiring unit 111, information on a picture imaged by the imaging device 6 (imaged moving picture information or imaged still picture information), information on a magnification percentage for imaging, and imaging device position information including a position and an orientation of the imaging device 6 upon imaging, as displayed information. The imaging device position information is expressed using a coordinate system $\Sigma_{b\_s}$ of the slave arm 2 as indicated in FIG. 5.

Figure 6:
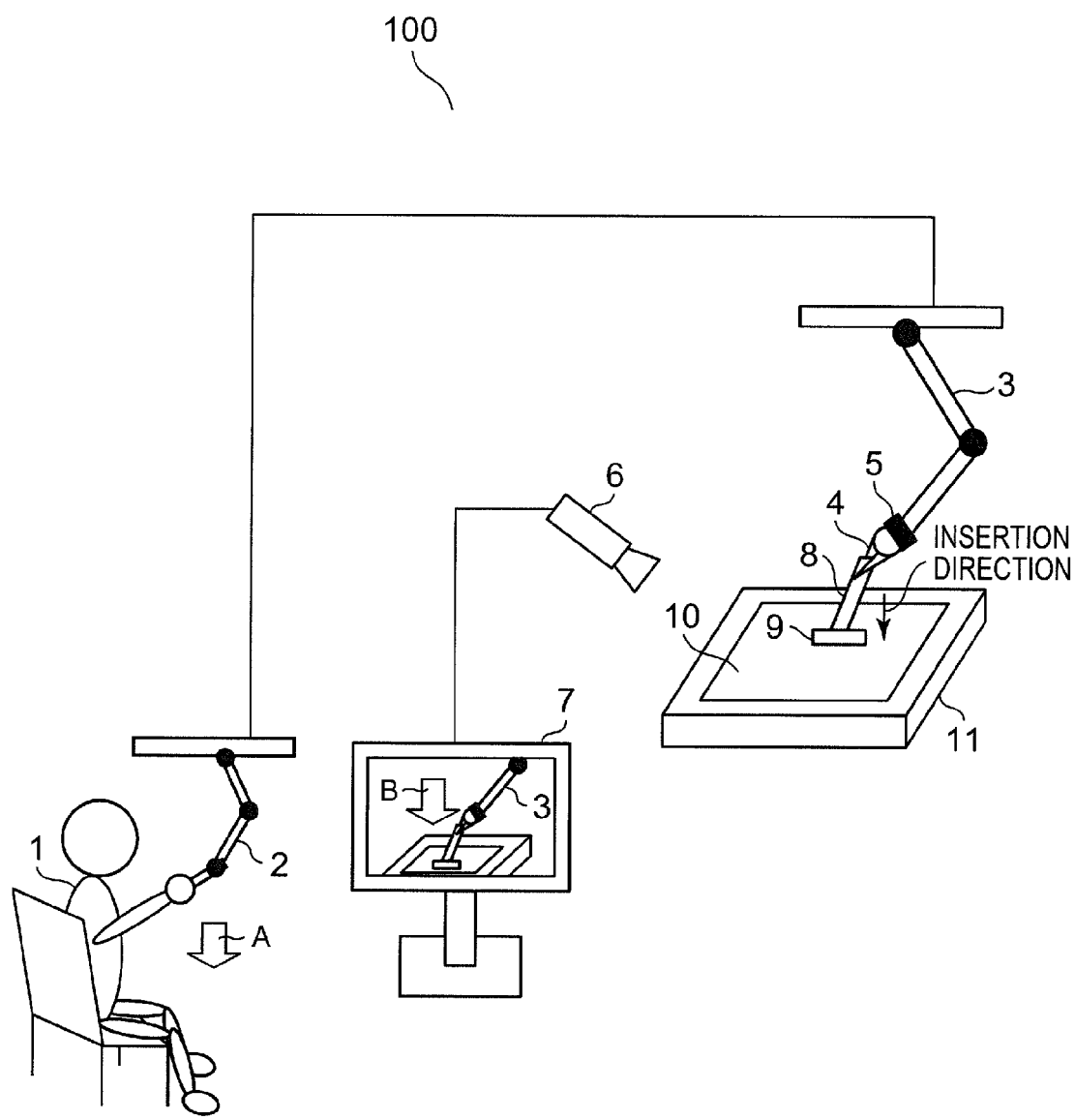
FIG. 6 is an explanatory view of a location position of the imaging device in the master slave robot according to the first embodiment of the present disclosure.

As shown in FIG. 6, the imaging device 6 is located so that a direction of manipulation of the master arm 2 by the operator 1 (an arrow A in FIG. 6) is parallel to a direction of motion of the slave arm 3 on the screen of the display 7 (an arrow B in FIG. 6).

The imaging device 6 exemplified in this case mainly performs two-dimensional imaging. The imaging device 6 can be alternatively a three-dimensional imaging device or include two imaging devices so as to image in various directions.

(Displayed Information Acquiring Unit 111)

The displayed information acquiring unit 111 receives imaged picture information, magnification percentage information, and imaging device position information from the imaging device 6 and time information from the timer incorporated in the master input/output IF 118. The imaged picture information transmitted from the displayed information acquiring unit 111 is displayed as a picture on the display 7.

FIG. 7 exemplifies the magnification percentage information and the imaging device position information (including orientation information on the imaging device) acquired by the displayed information acquiring unit 111 other than the imaged picture information, and the time information. Imaged picture information is a picture itself projected on the display 7. Displayed information includes imaged picture information, magnification percentage information, and imaging device position information. Magnification percentage information indicates a magnification percentage of a picture on the display 7 to an actual object in a case where an assembly task is displayed on the display 7, for example.

The displayed information acquiring unit 111 is capable of acquiring imaged picture information, magnification percentage information, and imaging device position information from the imaging device 6 by way of the master input/output IF 118.

The displayed information acquiring unit 111 transmits, to the target object information calculation unit 113, the imaged picture information, the magnification percentage information, the imaging device position information, and the time information thus acquired.

FIG. 7 exemplifies a case where the magnification percentage does not change in chronological order. The magnification percentage can alternatively change in chronological order. For example, when performing a task of widely shifting the gripped fine component 8 and then performing a task of attaching the fine component 8 to a connector, the magnification percentage is decreased in the step of the shifting task so that a wide region is imaged. In contrast, the magnification percentage is increased in the step of the attaching task so that an attached portion is more visible. The magnification percentage can change in chronological order in this manner. FIG. 8 exemplifies magnification percentage information in such a case.

(Master Motion Information Correcting Unit 112)

The master motion information correcting unit 112 receives motion information (master motion information) on the master arm 2 and time information from the master motion information acquiring unit 110. The master motion information correcting unit 112 calculates a shift amount of the hand 4 of the master arm 2 in each sampling period from the acquired motion information on the master arm 2, multiplies the calculated shift amount and a gain, and transmits the obtained value as corrected master motion information (a shift amount command value) to a slave controller 117.

Figure 9:
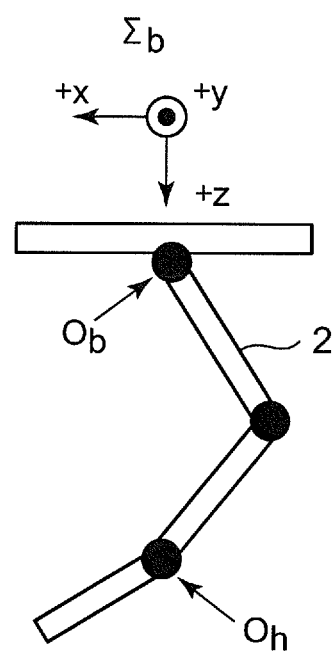
FIG. 9 is an explanatory view of a coordinate system in the master slave robot according to the first embodiment of the present disclosure.

Described next is how the master motion information correcting unit 112 calculates a shift amount of the hand 4 of the master arm 2. The motion information on the master arm 2 indicated in FIG. 3 includes a position and an orientation in a base coordinate system $\Sigma_b$ with an origin $O_b$ in FIG. 9 serving as a reference point. The master motion information correcting unit 112 converts this motion information to a shift amount in a hand coordinate system $\Sigma_h$ with an origin $O_h$ of the hand 4 serving as a reference point. More specifically, the master motion information correcting unit 112 multiplies a shift amount $d_b$ of a position and an orientation in each sampling period in the base coordinate system $\Sigma_b$ and a transformation matrix $^bT_h$ to calculate a shift amount $d_h$ of a position and an orientation in each sampling period in the hand coordinate system $\Sigma_h$. A shift amount d indicates a difference between a position and an orientation $p_0$ at time $t_0$ and a position and an orientation $p_1$ at time $t_1$ after elapse of one sampling period, that is, $d=\Delta p=p_1-p_0$.

Described next is how the master motion information correcting unit 112 calculates a shift amount command value. The master motion information correcting unit 112 multiplies respective elements (a position (x, y, z) and an orientation ($r_x$, $r_y$, $r_z$)) of the shift amount $d_h$ of a position and an orientation in each sampling period in the hand coordinate system $\Sigma_h$ and a gain $k_d$ (e.g. 0.1) to calculate corrected master motion information (a shift amount command value $d_m$). The master motion information correcting unit 112 sets the gain $k_d$ so as to have a value more than 1 when shift of the slave arm 2 is enlarged relatively to shift of the master arm 2. In contrast, the master motion information correcting unit 112 sets the gain $k_d$ so as to have a value less than 1 when shift is reduced. The master motion information correcting unit 112 is capable of setting the gain $k_d$ so as to have a constant for each element, and the operator 1 is capable of inputting the gain $k_d$ to the master motion information correcting unit 112 through the master input/output IF 118.

FIG. 10 exemplifies corrected master motion information and time information.

The master motion information correcting unit 112 transmits the corrected master motion information thus calculated and time information to the slave controller 117.

(Target Object Information Calculation Unit 113)

The target object information calculation unit 113 receives, from the displayed information acquiring unit 111, imaged picture information, magnification percentage information, imaging device position information, and time information. The target object information calculation unit 113 performs picture processing according to the imaged picture information thus received and calculates a color depth of the target object.

Exemplified below is how the target object information calculation unit 113 calculates a color depth. The target object information calculation unit 113 detects brightness of the target object from the imaged picture information thus acquired, and calculates a color depth such that less brightness indicates a deeper color and more brightness indicates a lighter color. More specifically, such brightness is indicated by a value from 0 to 10, and black is indicated by 0 whereas white is indicated by 10. A smaller numerical value indicates a deeper color.

Figure 11:
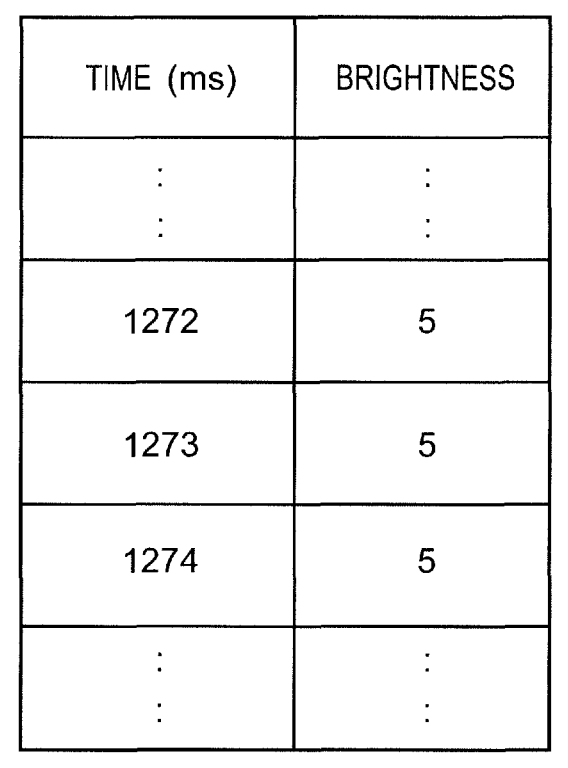

FIG. 11 exemplifies target object information and time information.

The target object information calculation unit 113 transmits the target object information thus calculated and time information to the force information correcting unit 114.

Measurement of a color depth can be made not within a narrow range but made by measuring the most apparent color in a certain region. The operator 1 is capable of inputting the size of the region through the master input/output IF 118 to the target object information calculation unit 113. The target object information calculation unit 113 is thus capable of accurately measuring a color depth of a target object that has slightly varying colors.

A color depth can be measured alternatively using an imaged picture thus acquired of which colors are converted into gray scale. The target object information calculation unit 113 is thus capable of accurately measuring a color depth in accordance with the converted gray scale.

(Force Information Correcting Unit 114)

The force information correcting unit 114 receives target object information and time information from the target object information calculation unit 113, as well as force information and time information from a force information acquiring unit 116. The force information correcting unit 114 corrects the force information in accordance with the target object information thus received to generate corrected force information. According to a method of correcting force information by the force information correcting unit 114, the force information correcting unit 114 converts the target object information thus acquired to a coefficient and multiplies the coefficient and the acquired force information, to correct the force information.

Figure 12A:
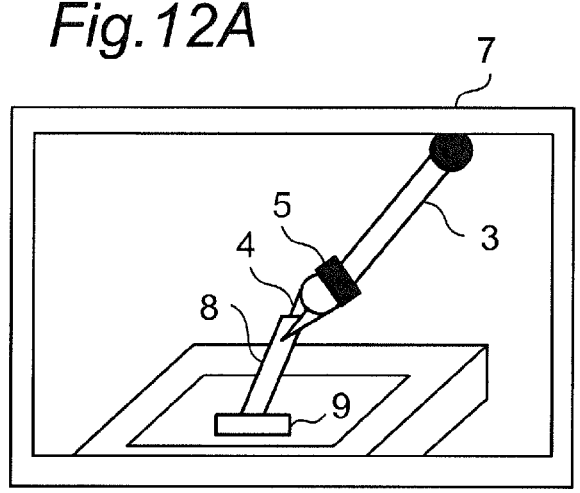
FIG. 12A is an explanatory view of correction of force information according to the target object information in the master slave robot according to the first embodiment of the present disclosure.
Figure 12B:
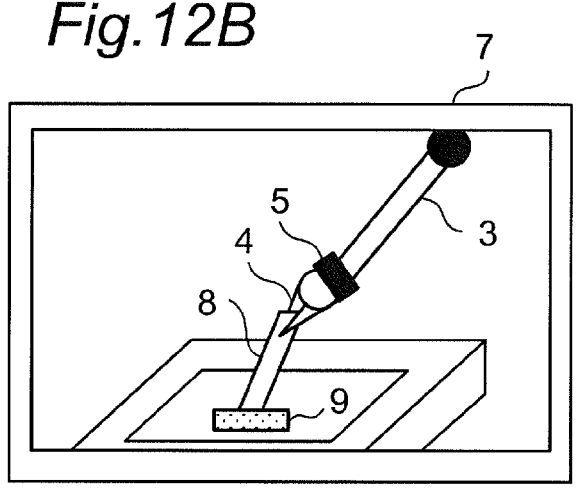
FIG. 12B is an explanatory view of correction of force information according to the target object information in the master slave robot according to the first embodiment of the present disclosure.
Figure 12C:
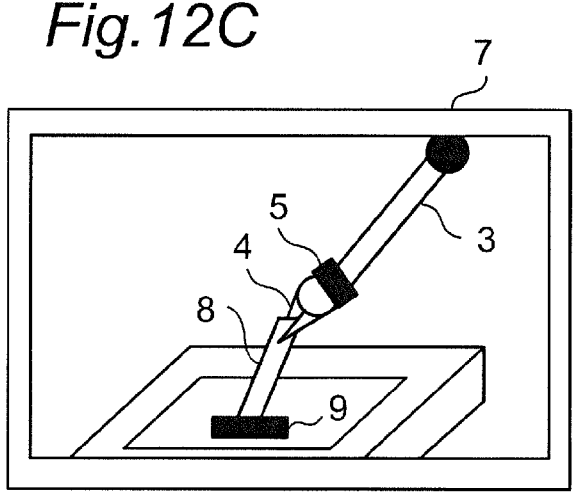
FIG. 12C is an explanatory view of correction of force information according to the target object information in the master slave robot according to the first embodiment of the present disclosure.
Figure 13A:
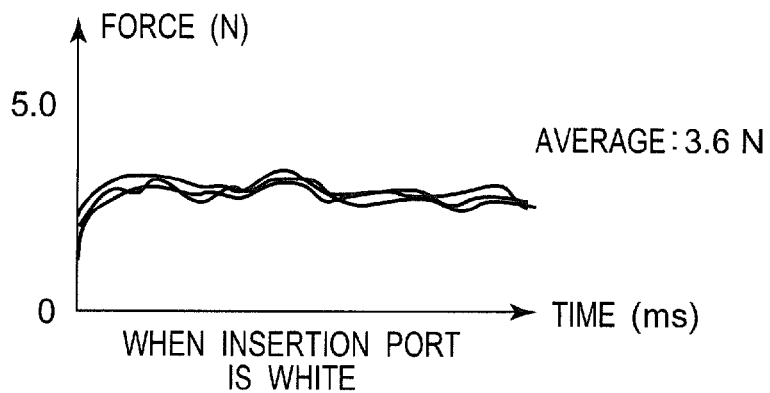
FIG. 13A is an explanatory view of correction of force information according to the target object information in the master slave robot according to the first embodiment of the present disclosure.
Figure 13B:
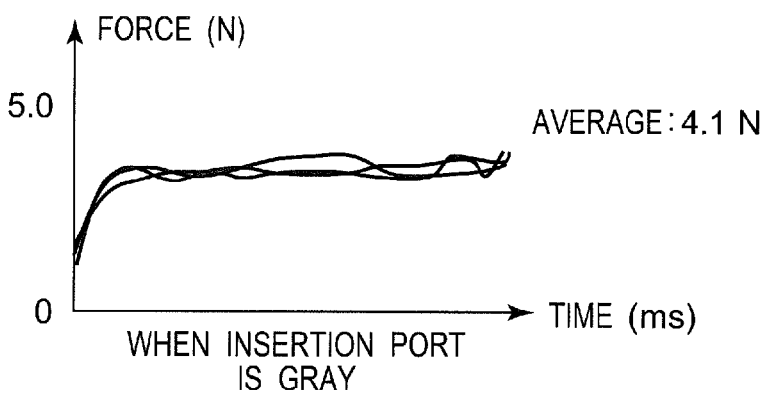
FIG. 13B is an explanatory view of correction of force information according to the target object information in the master slave robot according to the first embodiment of the present disclosure.
Figure 13C:
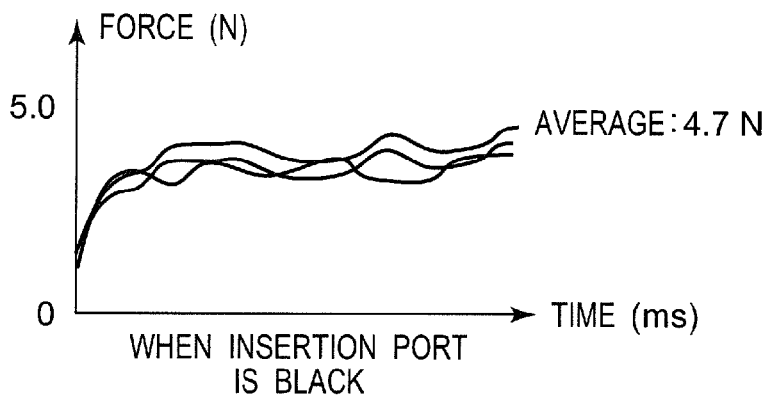
FIG. 13C is an explanatory view of correction of force information according to the target object information in the master slave robot according to the first embodiment of the present disclosure.

The force information correcting unit 114 corrects the force information such that the force information is increased as the target object information includes a deeper color. When watching a target object, the operator 1 determines with prejudice that a target object in a deeper color is heavier. The operator 1 then regards the target object in the deeper color as being heavier. An example is described with reference to FIGS. 12A to 12C. FIGS. 12A to 12C differ from one another in color of the insertion port 9 as another example of a target object. FIG. 12A indicates white as a light color (brightness 10), FIG. 12B indicates gray (brightness 5), and FIG. 12C indicates black as a deep color (brightness 0). There was executed a test of inserting the fine component 8 to each of the insertion ports 9 different in color depth. FIGS. 13A to 13C indicate results of measurement of force applied for insertion. FIGS. 13A, 13B, and 13C indicate the results for the insertion ports 9 in white, gray, and black, respectively. Applied force for the white insertion port 9 is 3.6 N on average, applied force for the gray insertion port 9 is 4.1 N on average, and applied force for the black insertion port 9 is 4.7 N on average. The applied force is larger in the order of the insertion ports 9 in black, gray, and white. The operator 1 determines that the target object is heavier when the insertion port 9 has a deeper color, and applies larger force to the target object.

The force information correcting unit 114 corrects the force information to a value obtained by multiplying the force information and the target object information converted to the coefficient so that equal force can be applied to the target object even when the target object has a different color depth. When the color is deeper, the force information correcting unit 114 corrects to increase the force information. The operator 1 is thus guided to apply equal force to the target object regardless of the color depth of the target object.

Described below is a specific correction method by the force information correcting unit 114. The brightness of the target object information thus acquired is a value from 0 to 10, and the force information correcting unit 114 converts this value to a coefficient from 1 to an upper limit value. The operator 1 is capable of inputting the upper limit value through the master input/output IF 118 to the force information correcting unit 114. In the examples of FIGS. 13A to 13C, the upper limit value is 1.3, which is obtained by dividing 4.7 N as the force for the black color (brightness 0) by 3.6 N as the force for the white color (brightness 0). The coefficient for brightness 0 is set to the upper limit value of 1.3, whereas the coefficient for brightness 10 is set to 1. The force information correcting unit 114 obtains the values therebetween by linear complementation. In this manner, the force information correcting unit 114 converts acquired brightness to a coefficient from 1 to 1.3 such that the value increases as the color is deeper. The force information correcting unit 114 calculates corrected force information by multiplying the coefficient obtained by conversion and the force information. The upper limit value can be fixed in the above manner, or the operator 1 can input any upper limit value through the master input/output IF 118 to the force information correcting unit 114.

The coefficients are obtained assuming that the coefficient for brightness 10 (white) is 1 (a reference value) in this case. The reference value 1 of the coefficient can have any value of brightness. For example, by setting the coefficient to 1 for the white color, the force information correcting unit 114 corrects to increase force in a case where the target object is likely to break and cannot receive a large load. This effectively prevents application of excessive force. Alternatively, by setting the coefficient to 1 for the black color, the force information correcting unit 114 corrects to decrease force in a case where the task requires large force. The operator 1 is then effectively guided to apply large force. It is possible to change the reference value in accordance with a task or a target object in these manners. The operator 1 is capable of inputting the brightness serving as the reference value through the master input/output IF 118 to the force information correcting unit 114.

The force information correcting unit 114 transmits the corrected force information thus generated and time information to the force information presentation unit 115.

The force information correcting unit 114 can alternatively set a range of force correction with a threshold value. The force information correcting unit 114 sets the upper limit threshold value in the following manner, for example. When the force information correcting unit 114 determines that the absolute value of corrected force is more than the absolute value (e.g. 10 N) of the upper limit value set by the force information correcting unit 114, the force information correcting unit 114 corrects the absolute value of the corrected force to the absolute value of the upper limit value. The force information correcting unit 114 sets the lower limit threshold value in the following manner, for example. When the force information correcting unit 114 determines that the absolute value of corrected force is less than the absolute value (e.g. 1 N) of the lower limit value set by the force information correcting unit 114, the force information correcting unit 114 corrects the absolute value of the corrected force to the absolute value of the force not yet corrected.

As to timing of force correction, the force information correcting unit 114 performs force correction from the start to the end of the task. The force information correcting unit 114 is alternatively capable of determining whether or not to perform force correction in accordance with a coefficient obtained by converting target object information. In an example, force correction is performed if the coefficient is out of a certain range (0.9 to 1.1) and force correction is not performed if the coefficient is within the range. The force information correcting unit 114 determines whether or not to perform force correction in accordance with the provided range to avoid the influence of an error or the like of the target object information. The force information correcting unit 114 is thus capable of performing correction for a task requiring force correction.

The force information correcting unit 114 corrects magnitude of force information in the above case. The force information correcting unit 114 is alternatively capable of correcting an update period of force information. In the above disclosure, the force information acquiring unit 115 acquires force information in every predetermined constant period (e.g. 1 msec) and transmits the same to the force information correcting unit 114 that performs update. The force information correcting unit 114 is alternatively capable of changing to shorten or extend the update period from the predetermined period. Specifically, when force information is expected to increase in magnitude, the force information correcting unit 114 extends the update period of force information from the predetermined period without changing the magnitude of the force information. More particularly, when force information is expected to be doubled, the force information correcting unit 114 doubles the update period, for example. In contrast, when force information is expected to decrease in magnitude, the force information correcting unit 114 shortens the update period of force information from the predetermined period without changing the magnitude of the force information. More particularly, when force information is expected to be halved, the force information correcting unit 114 halves the update period, for example.

Figure 14:
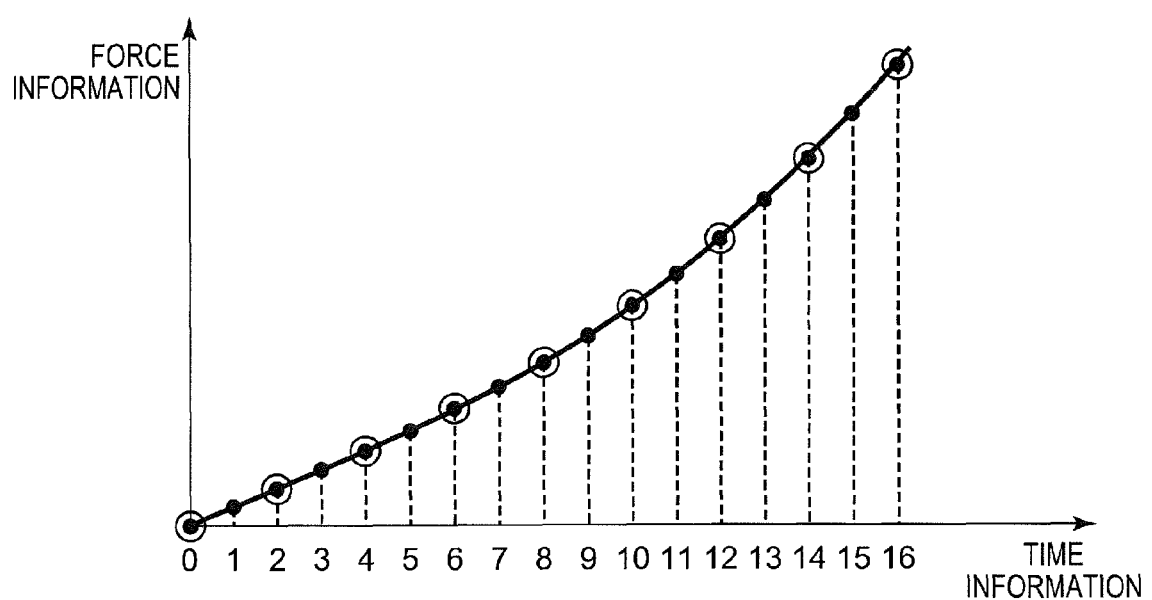
FIG. 14 is an explanatory graph of change in update period of force information in the master slave robot according to the first embodiment of the present disclosure.

Described with reference to the graph in FIG. 14 is why change in update period of force information by the force information correcting unit 114 effects similarly to change in magnitude of the force information by the force information correcting unit 114. FIG. 14 indicates chronological data of force information, with the transverse axis indicating time information and the ordinate axis indicating force information. Numerical values on the transverse axis indicate time information. In the force information, black circles indicate data having the update period of 1 msec, whereas white circles indicate data having the update period of 2 msec. When the force information is denoted by $F_k$, k=1, 2, 3, . . . is applicable if the update period is 1 msec, whereas k=2, 4, 6, . . . is applicable if the update period is 2 msec. Displacement of the force information in each update period is denoted by $\Delta F_k$. For example, when the time information is 2, the force information correcting unit 114 calculates displacement $\Delta F_2 = F_2 - F_1$ in each update period of the force information if the update period is 1 msec, whereas the force information correcting unit 114 calculates displacement $\Delta F_2 = F_2 - F_0$ if the update period is 2 msec. The displacement $\Delta F_2$ of the force information with the update period of 2 msec is larger than the displacement $\Delta F_2$ with the update period of 1 msec. Displacement of force information is increased if an update period is extended as in this example, so that the operator 1 senses as if the force information is increased. It is because the operator 1 senses displacement of force when sensing force. The update period is about 1 to 500 msec in an example.

In this manner, in order to correct force information, the force information correcting unit 114 is alternatively capable of not correcting magnitude of the force information but correcting an update period of the force information. Magnitude of the force information is not changed by the correction, so that the force information can be prevented from changing too much. Even with a system that cannot correct magnitude of force information, it is possible to achieve an effect similar to that of correcting the magnitude of the force information.

(Force Information Presentation Unit 115)

The force information presentation unit 115 receives corrected force information and time information from the force information correcting unit 114. The force information presentation unit 115 generates a command value to allow the master arm 2 to output the corrected force information, so as to present to the operator 1 the corrected force information thus acquired by way of the master input/output IF 118 and a master motor driver 119 by means of the master arm 2. When the corrected force information is presented to the operator 1 by means of the master arm 2, presented information and the like can be displayed on the display 7.

A method of generating a command value is described. If the master arm 2 is an arm of which force is controllable, the force information presentation unit 115 uses corrected force information itself as a command value. If the master arm 2 is an arm of which force is uncontrollable but of which position is controllable, the force information presentation unit 115 converts corrected force information to position information in accordance with the Hook's law. The force information presentation unit 115 uses the converted position information as a command value.

The force information presentation unit 115 transmits the generated command value for the master arm 2 in each sampling period, to the master arm 2 by way of the master input/output IF 118 and the master motor driver 119.

<Description of Slave Control Apparatus Main Body>

The slave control apparatus main body 107 includes the force information acquiring unit 116 and the slave controller 117.

(Force Sensor 5)

As shown in FIG. 1, the force sensor 5 is located at the wrist of the hand 4 of the slave arm 3 and measures reactive force generated when the target object is in contact with a receiving object. Used in this case is a force sensor that is capable of measuring totally six axes including three force axes and three torque axes. It is possible to use any force sensor that is capable of measuring one or more axes. The force sensor 5 is embodied by a strain gauge force sensor or the like.

Force information measured by the force sensor 5 is transmitted to the force information acquiring unit 116 as force information on force externally provided to the slave arm 3.

(Force Information Acquiring Unit 116)

Figures 15, 16:
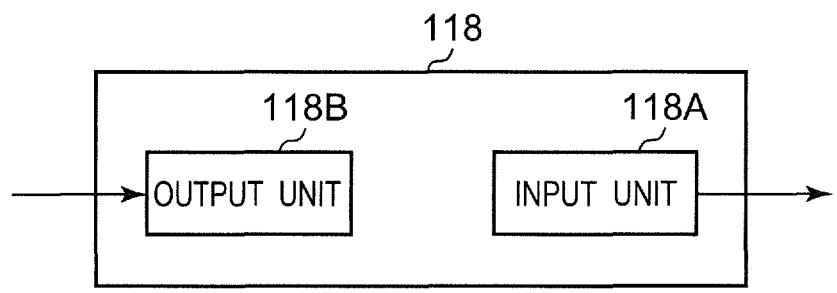
FIG. 15 is a view showing data of force information and time information on the master slave robot according to the first embodiment of the present disclosure.
FIG. 16 is a block diagram of a master input/output IF in the master slave robot according to the first embodiment of the present disclosure.

The force information acquiring unit 116 receives force information from the force sensor 5 and time information from a timer incorporated in a slave input/output IF 120. FIG. 15 indicates force information and time information.

The force information acquiring unit 116 is alternatively capable of acquiring force information from the force sensor 5 by way of the slave input/output IF 120.

The force information acquiring unit 116 transmits the force information and the time information thus acquired to the force information correcting unit 114.

(Slave Controller 117)

The slave controller 117 receives corrected master motion information and time information from the master motion information correcting unit 112. The slave controller 117 generates a command value in accordance with the corrected master motion information thus acquired so as to shift the slave arm 3.

Described below is how the slave controller 117 generates a command value. The corrected master motion information acquired by the slave controller 117 relates to a shift amount of the hand 4. The slave controller 117 initially calculates a position and an orientation shifted by the acquired shift amount in the coordinate system of the hand 4 of the slave arm 3. The slave controller 117 converts the position and the orientation thus calculated by the slave controller 117 in the coordinate system of the hand 4 to a position and an orientation in the base coordinate system of the slave arm 3. The slave controller 117 subsequently generates a command value used for shifting to the position and the orientation thus converted in the base coordinate system of the slave arm 3.

The slave controller 117 transmits the generated command value for the slave arm 3 in each sampling period, to the slave arm 3 by way of the slave input/output IF 120 and a slave motor driver 121.

<Description of Master Peripheral Device>

The master peripheral device 108 includes the master input/output IF 118 and the master motor driver 119.

(Master Input/Output IF 118)

The master input/output IF 118 transmits the command value received from the force information presentation unit 115 to the master motor driver 119. The master input/output IF 118 obtains position information and orientation information on the master arm 2 from the value received from an encoder of each joint shaft in the master arm 2 at a calculating unit (not shown) in the encoder, and transmits, from the master input/output IF 118 to the master motion information acquiring unit 110, the position information, the orientation information, and time information from the timer incorporated in the master input/output IF 118. The time information from the timer incorporated in the master input/output IF 118 is transmitted to the displayed information acquiring unit 111. As shown in FIG. 16, the master input/output IF 118 includes an input unit 118A and an output unit 118B. The input unit 118A configures an input IF, and is used when the operator 1 selects an item using a keyboard, a mouse, a touch panel, a sound input device, or the like, or when the operator 1 inputs a number using a keyboard, a mouse, a touch panel, a sound input device, or the like, for example. The output unit 118B configures an output IF, and is used when acquired information or the like is outputted, or when the information is projected on the display 7 or the like, for example.

(Master Motor Driver 119)

The master motor driver 119 transmits, to the master arm 2, a command value for a motor of each joint shaft in the master arm 2 in order to control the master arm 2 in accordance with the command value acquired from the master input/output IF 118.

<Description of Slave Peripheral Device>

The slave peripheral device 109 includes the slave input/output IF 120 and the slave motor driver 121.

(Slave Input/Output IF 120)

The slave input/output IF 120 transmits the command value received from the slave controller 117 to the slave motor driver 121. Time information from the timer incorporated in the slave input/output IF 120 is transmitted to the force information acquiring unit 116. Similarly to the master input/output IF 118, the slave input/output IF 120 includes an input unit 120A and an output unit 120B that are configured as shown in FIG. 16. The input unit 120A configures an input IF, and is used when the operator 1 selects an item using a keyboard, a mouse, a touch panel, a sound input device, or the like, or when the operator 1 inputs a number using a keyboard, a mouse, a touch panel, a sound input device, or the like, for example. The output unit 120B configures an output IF, and is used when acquired information or the like is outputted, or when the information is projected on the display 7 or the like, for example.

(Slave Motor Driver 121)

The slave motor driver 121 transmits, to the slave arm 3, a command value for a motor of each joint shaft in the slave arm 3 in order to control the slave arm 3 in accordance with the command value acquired from the slave input/output IF 120.

<Description of Master Arm 2>

In the master arm 2, the calculating unit in each encoder of the master arm 2 obtains motion information on the master arm 2 at a constant time interval (e.g. every 1 msec) using the timer incorporated in the master input/output IF 118. The motion information thus obtained is transmitted to the master input/output IF 118. The master arm 2 is controlled in accordance with a command value from the master motor driver 119.

The master arm 2 includes joints each of which has the motor and an encoder, so as to be controlled to a position and an orientation as desired. In this case, the master arm 2 configures a multiple link manipulator of six degrees of freedom, which has six joints. The number of the joints and the degrees of freedom of the master arm 2 are not limited to those of the first embodiment, but can be any numbers equal to one or more.

<Description of Slave Arm>

In the slave arm 3, the calculating unit in each encoder of the slave arm 3 obtains motion information on the slave arm 3 at a constant time interval (e.g. every 1 msec) using the timer incorporated in the slave input/output IF 120. The motion information thus obtained is transmitted to the slave input/output IF 120. The slave arm 3 is controlled in accordance with a command value from the slave motor driver 121.

The slave arm 3 includes joints each of which has the motor and an encoder, so as to be controlled to a position and an orientation as desired. In this case, the slave arm 3 configures a multiple link manipulator of six degrees of freedom, which has six joints. The number of the joints and the degrees of freedom of the slave arm 3 are not limited to those of the first embodiment, but can be any numbers equal to one or more.

<Flowchart>

An operation procedure of the master slave robot 100 according to the first embodiment is described with reference to the flowcharts in FIGS. 17 and 18.

Figure 17:
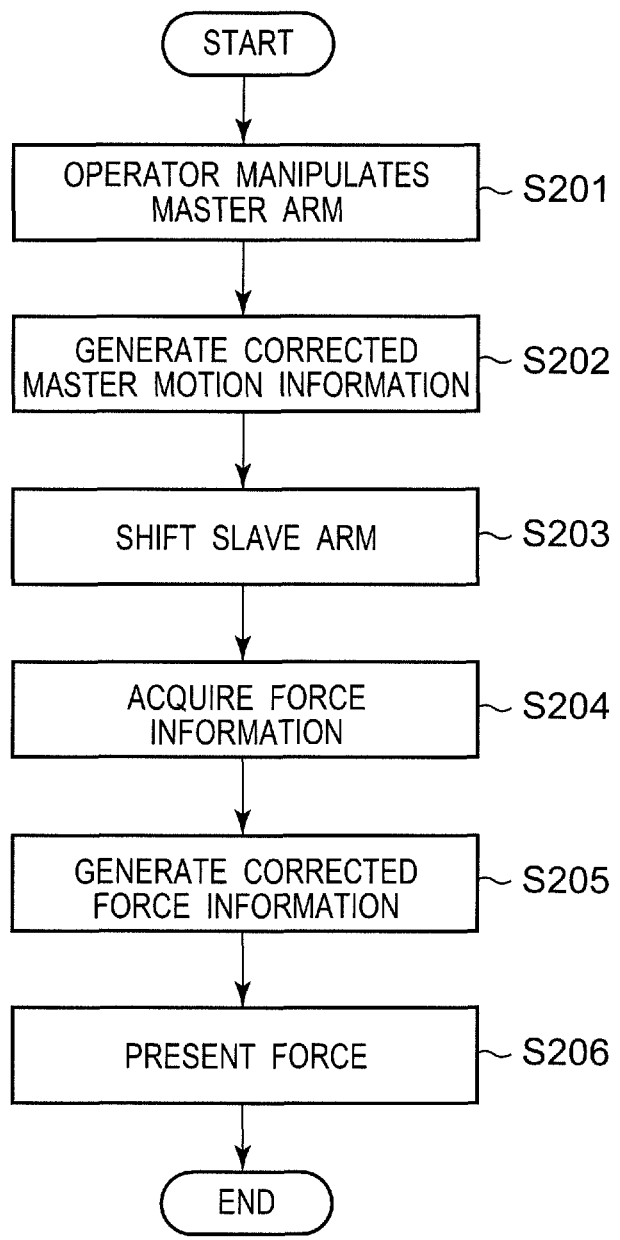
FIG. 17 is a flowchart of an operation procedure of the master slave robot according to the first embodiment of the present disclosure.

FIG. 17 exemplifies operation of the master slave robot 100 according to the first embodiment.

Initially in step S201, the operator 1 grips and manipulates the master arm 2 while watching a picture projected on the display 7. The flow then proceeds to step S202.

Then, in step S202, the master motion information correcting unit 112 corrects master motion information thus acquired and generates corrected master motion information used for shifting the slave arm 3. The flow then proceeds to step S203.

Then, in step S203, the slave controller 117 generates a command value in accordance with the corrected master motion information acquired from the master motion information correcting unit 112 so as to shift the slave arm 3. The slave controller 117 transmits the generated command value for the slave arm 3 in each sampling period, to the slave arm 3 by way of the slave input/output IF 120 and a slave motor driver 121. Thus, the slave arm 3 shifts and performs the task. The flow then proceeds to step S204.

Then, in step S204, the force sensor 5 attached to the arm tip of the slave arm 3 detects force information generated during the task, and the force information acquiring unit 116 acquires the detected force information. The flow then proceeds to step S205.

Then, in step S205, the force information correcting unit 113 corrects the force information acquired by the force information acquiring unit 116 in accordance with the target object information acquired from the target object information calculation unit 113 to generate corrected force information. The flow then proceeds to step S206.

Then, in step S206, the force information presentation unit 115 allows the master arm 2 to present force by way of the master input/output IF 118 to the operator 1 in accordance with the corrected force information generated by the force information correcting unit 113.

The series of the operation procedure ends at this stage.

Figure 18:
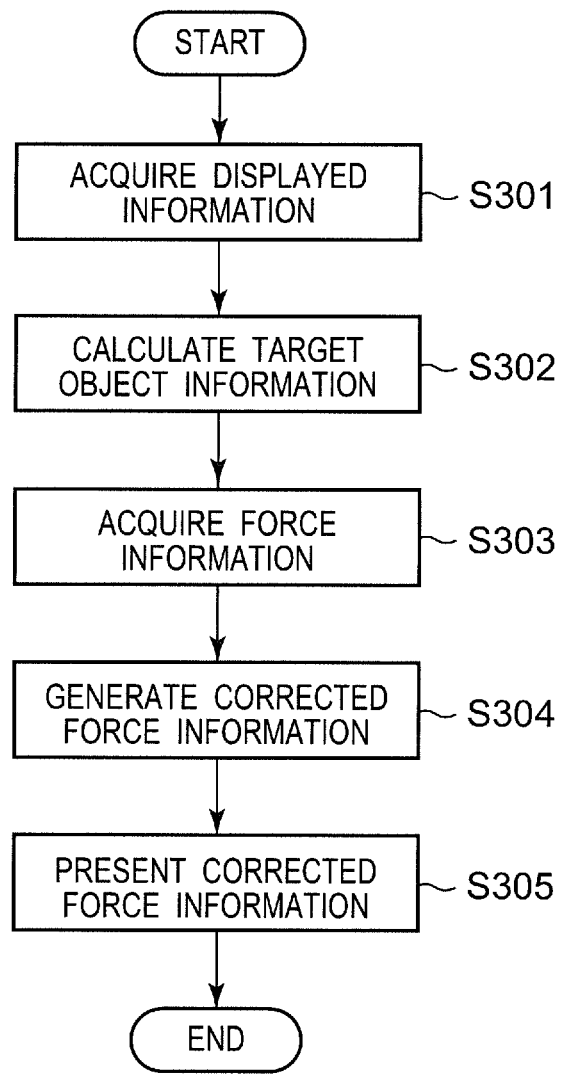
FIG. 18 is a flowchart of a force correction procedure of the master slave robot according to the first embodiment of the present disclosure.

Detailed with reference to FIG. 18 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S302.

Then, in step S302, the target object information calculation unit 113 obtains target object information expressed by brightness in the displayed information thus acquired. The flow then proceeds to step S303.

Then, instep S303, the force information acquiring unit 116 acquires force information. The flow then proceeds to step S304.

Then, in step S304, the force information correcting unit 114 multiplies the force information acquired from the force information acquiring unit 116 and the coefficient converted from the target object information to generate corrected force information that is corrected in accordance with the target object information. The flow then proceeds to step S305.

Then, in step S305, the force information presentation unit 115 generates a command value for the master arm 2 in accordance with the corrected force information acquired from the force information correcting unit 114, and causes the master arm 2 to present force by way of the master input/output IF 118 and the master motor driver 119 so that the force is presented to the operator 1.

Effects of First Embodiment

Even when the operator 1 has prejudice different from the reality due to a color depth of a target object on the screen, the force information correcting unit 114 corrects force information in accordance with target object information on the color depth on the screen, and the force information presentation unit 115 performs force presentation. The operator 1 is thus capable of performing a task accurately. In other words, the operator 1 can perform the task efficiently by operating the master slave robot 100 while watching a motion picture, even when the target object appears differently on the screen due to the color depth.

Second Embodiment

The first embodiment enables operation according to how a color depth of a target object appears on the screen by correction of force information according to the color of the target object. The second embodiment enables operation according to how the material of the target object appears on the screen by correction of force information according to the material of the target object.

Figure 19:
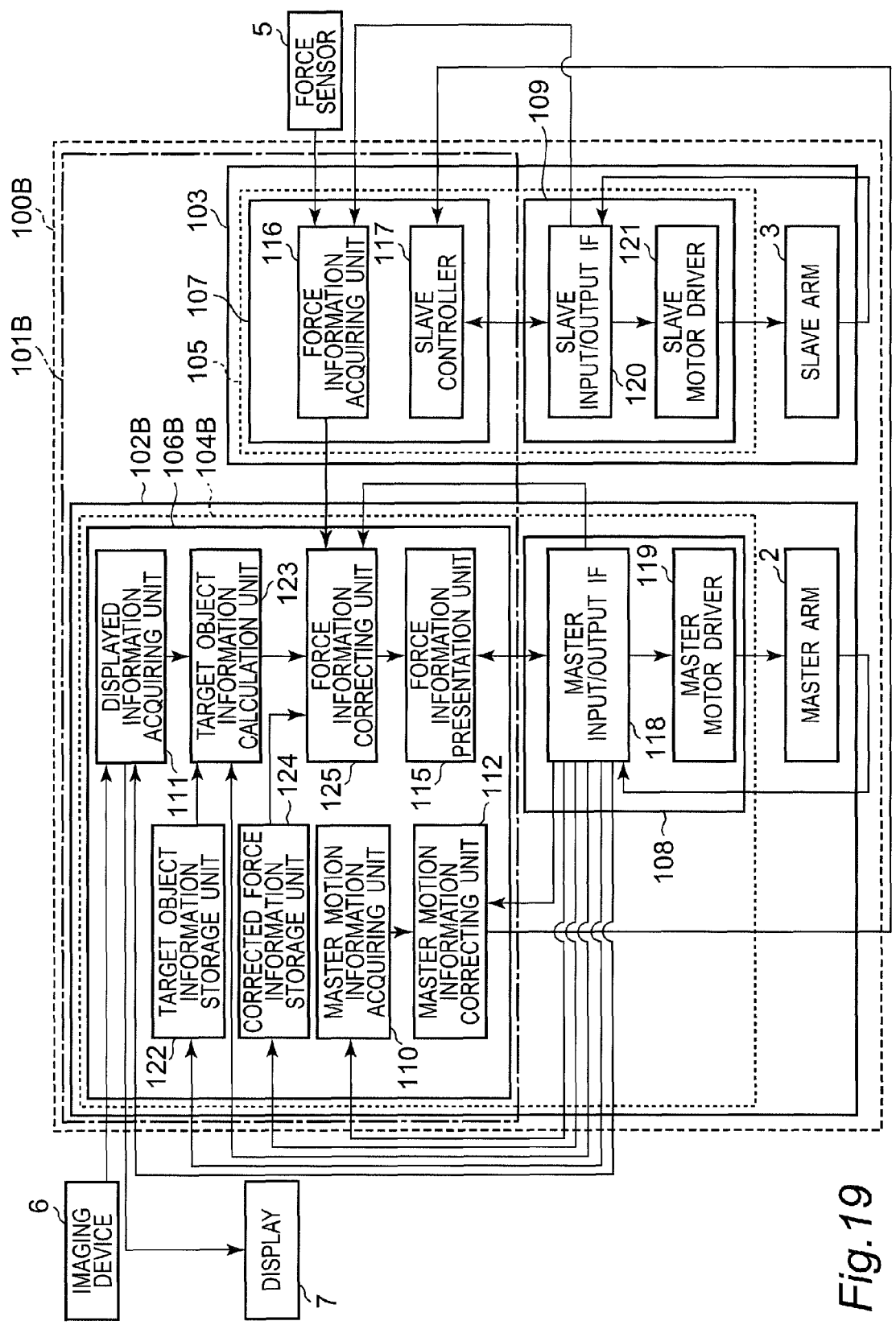
FIG. 19 is a block diagram of a master slave robot according to a second embodiment of the present disclosure.

Schematically described is a master slave robot 100B including a control apparatus 101B for the master slave robot 100B according to the second embodiment of the present disclosure. FIG. 19 is a block diagram of the master slave robot 100B according to the second embodiment of the present disclosure. According to the second embodiment of the present disclosure, the master arm 2 and the master peripheral device 108, as well as the master motion information acquiring unit 110, the displayed information acquiring unit 111, the master motion information correcting unit 112, and the force information presentation unit 115 in a master control apparatus 106B included in a master robot 102B, and the slave robot 103 are configured similarly to those of the first embodiment. These common portions are denoted by the common reference signs and are not described repeatedly, and only different portions (such as a target object information storage unit 122, a target object information calculation unit 123, a corrected force information storage unit 124, and a force information correcting unit 125) are to be detailed below.

(Target Object Information Storage Unit 122)

Figure 20:
FIG. 20 is a view showing data of reference picture information and material information related to target object information on the master slave robot according to the second embodiment of the present disclosure.
Figure 20:
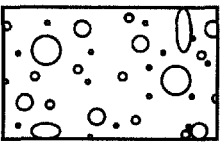
Figure 20:

The target object information storage unit 122 stores reference picture information and material information on the material of the target object. FIG. 20 exemplifies correlation between reference picture information and material information. The target object information storage unit 122 can receive reference picture information and material information to be stored from the operator 1 or the like through the master input/output IF 118, or from a different database. The target object information storage unit 122 transmits reference picture information and material information related to target object information, to the target object information calculation unit 123.

(Target Object Information Calculation Unit 123)

The target object information calculation unit 123 receives imaged picture information, magnification percentage information, imaging device position information, and time information from the displayed information acquiring unit 111, and receives reference picture information and material information from the target object information storage unit 122. The target object information calculation unit 123 performs picture processing according to the imaged picture information and the reference picture information thus received and calculates a material of the target object.

Exemplified below is how the target object information calculation unit 123 calculates a material of the target object. The target object information calculation unit 123 searches the reference picture information for a picture similar to the imaged picture information thus acquired, with reference to a feature quantity. The target object information calculation unit 123 regards, as target object information, material information related to the reference picture information that is searched for and matches. In an example, the target object information calculation unit 123 regards material information as 1: aluminum if no matching reference picture information is searched out.

FIG. 21 exemplifies target object information and time information.

The target object information calculation unit 123 transmits target object information thus calculated and time information to the force information correcting unit 125.

Applicable methods of calculating a material of the target object by the target object information calculation unit 123 include the picture decision as well as a method of calculating a material by the target object information calculation unit 123 with reference to material type numbers preregistered in a database, a method of calculating a material by the target object information calculation unit 123 with reference to component material information that can be acquired preliminarily, and a method of calculating a material by the target object information calculation unit 123 with reference to a database on tasks and components. For example, according to the method of calculating a material by the target object information calculation unit 123 with reference to the database on tasks and components, the target object information calculation unit 123 receives task identification information from the operator 1 or the like through the master input/output IF 118 or from a different database, and the target object information calculation unit 123 preliminarily stores correlation information among task identification information, components, and materials or is capable of acquiring the correlation information from a different database preliminarily storing the correlation information. The target object information calculation unit 123 is thus capable of calculating a material from the task identification information thus received and the correlation information.

(Corrected Force Information Storage Unit 124)

The corrected force information storage unit 124 stores material information on the target object and corrected information. FIG. 22 exemplifies material information and corrected information. The corrected force information storage unit 124 can receive material information and corrected information to be stored from the operator 1 or the like through the master input/output IF 118 or from a different database. The corrected force information storage unit 124 transmits the material information as the target object information and the corrected information to the force information correcting unit 125.

(Force Information Correcting Unit 125)

The force information correcting unit 125 receives target object information and time information from the target object information calculation unit 123, target object information and corrected information from the corrected force information storage unit 124, and force information and time information from the force information acquiring unit 116. The force information correcting unit 125 calculates corrected information from the target object information thus received, and multiplies the corrected information thus calculated and the force information to correct the force information.

Figure 23A:
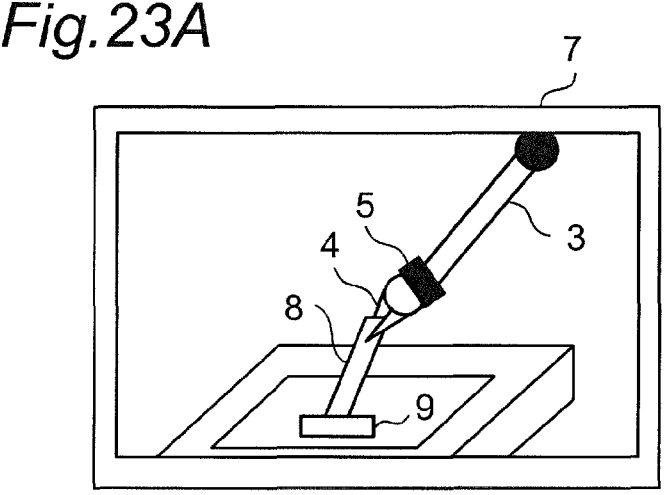
FIG. 23A is an explanatory view of correction of force information according to the target object information in the master slave robot according to the second embodiment of the present disclosure.
Figure 23B:
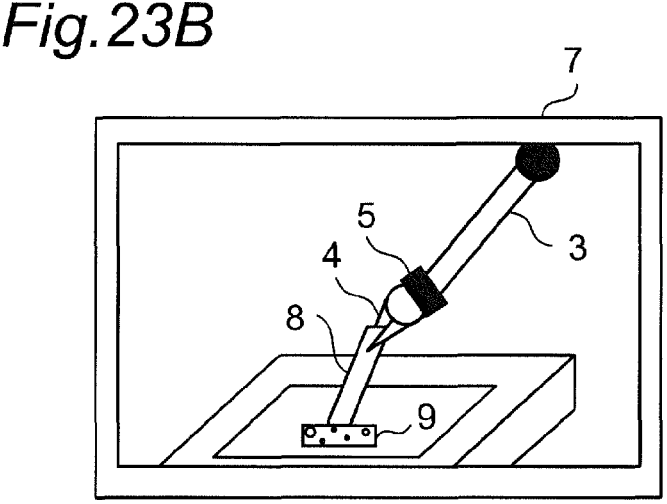
FIG. 23B is an explanatory view of correction of force information according to the target object information in the master slave robot according to the second embodiment of the present disclosure.
Figure 23C:
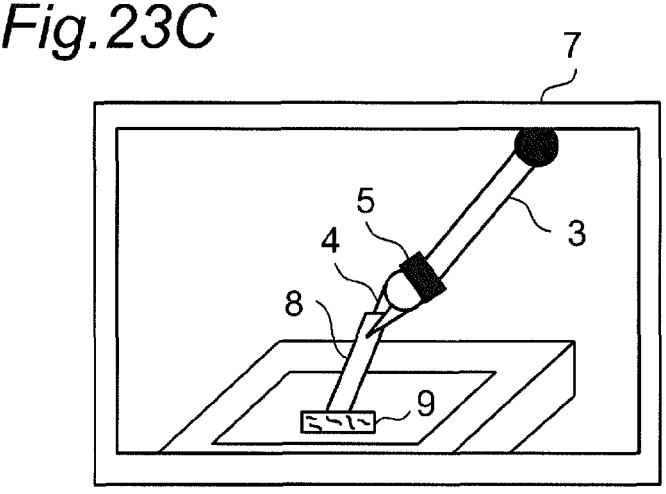
FIG. 23C is an explanatory view of correction of force information according to the target object information in the master slave robot according to the second embodiment of the present disclosure.
Figure 24A:
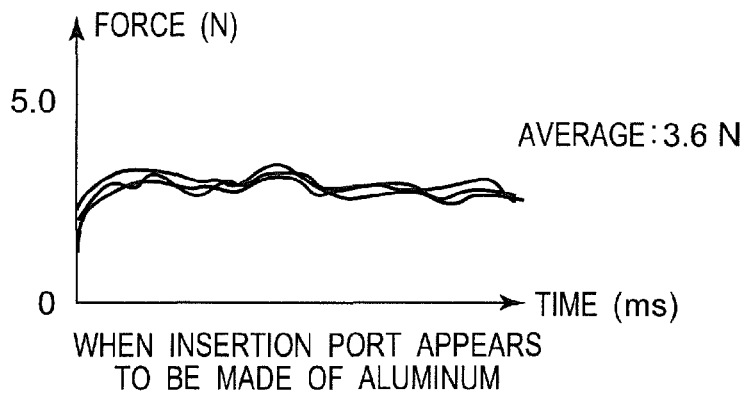
FIG. 24A is an explanatory view of correction of force information according to the target object information in the master slave robot according to the second embodiment of the present disclosure.
Figure 24B:
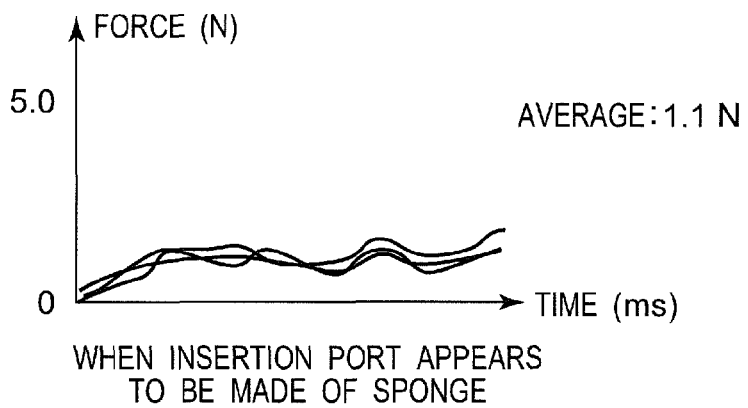
FIG. 24B is an explanatory view of correction of force information according to the target object information in the master slave robot according to the second embodiment of the present disclosure.
Figure 24C:
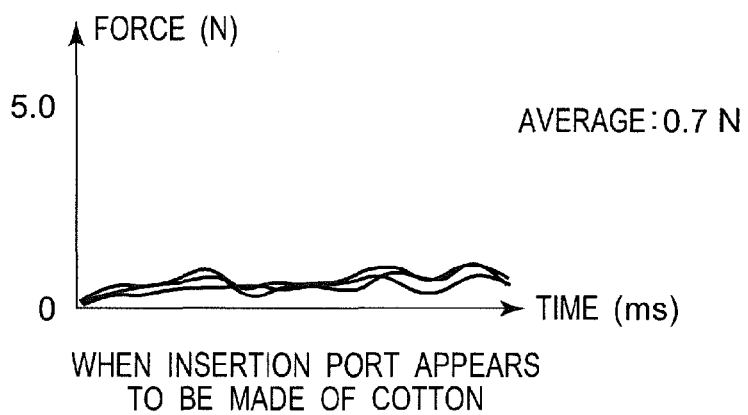
FIG. 24C is an explanatory view of correction of force information according to the target object information in the master slave robot according to the second embodiment of the present disclosure.

The force information correcting unit 125 corrects the force information such that the force information is decreased as the material of the target object appears to be softer. When watching a target object to perform a task to an identical target object, the operator 1 determines with prejudice that a target object made of a material appearing to be softer is lighter. The operator 1 then regards the target object appearing to be softer as being lighter. In this manner, the operator 1 regards the target object differently depending on how the material appears if the surface of a portion displayed on the screen is made of a different material in each of the same target objects. A case is exemplified with reference to FIGS. 23A to 23C. FIGS. 23A to 23C differ from one another in how the material of the insertion port 9 appears. The insertion port 9 in FIG. 23A appears to be made of aluminum, the insertion port 9 in FIG. 23B appears to be made of sponge, and the insertion port 9 in FIG. 23C appears to be made of cotton. There was executed a test of inserting the fine component 8 to each of the insertion ports 9 of which materials appear differently on the screen. FIGS. 24A to 24C indicate results of measurement of force applied for insertion. FIGS. 24A, 24B, and 24C indicate the results for the insertion ports 9 of which materials appear to be aluminum, sponge, and cotton, respectively. Applied force for the insertion port 9 appearing to be made of aluminum is 3.6 N on average, applied force for the insertion port 9 appearing to be made of sponge is 1.1 N on average, and applied force for the insertion port 9 appearing to be made of cotton is 0.7 N on average. The applied force is larger in the order of the insertion ports 9 appearing to be made of aluminum, sponge, and cotton. The operator 1 determines that the target object is lighter when the material of the insertion port 9 appears to be softer, and applies only small force to the target object.

In this manner, the force information correcting unit 125 corrects force information to a value obtained by multiplying the force information and target object information so that equal force can be applied to the target object even when the material of the target object differs in appearance. When the material appears to be softer, the force information correcting unit 125 corrects to decrease the force information. The operator 1 is thus guided to apply equal force to the target object regardless of how the material of the target object appears.

Described below is a specific correction method by the force information correcting unit 125. The force information correcting unit 125 obtains corrected information matching the target object information acquired from the target object information calculation unit 123, from the target object information and the corrected information acquired from the corrected force information storage unit 124. The force information correcting unit 125 calculates corrected force information by multiplying the corrected information thus obtained and the force information.

In this case, the corrected information is assumed as 1 (a reference value) when the material appears to be aluminum. The reference value 1 for the corrected information can have any value of reference picture information. For example, by setting the corrected information to 1 when the material appears to be aluminum, the force information correcting unit 125 corrects to decrease force in a case where the task requires large force. The operator 1 is then effectively guided to apply larger force. Furthermore, by setting the corrected information to 1 when the material appears to be sponge or cotton, the force information correcting unit 125 corrects to increase force in a case where the target object is likely to break and cannot receive a large load. This effectively prevents application of excessive force. The force information correcting unit 125 is capable of changing the reference value in accordance with a task or a target object in these manners. The operator 1 is capable of inputting the reference picture information serving as the reference value through the master input/output IF 118.

The force information correcting unit 125 transmits the corrected force information thus generated and time information to the force information presentation unit 115.

<Flowchart>

Figure 25:
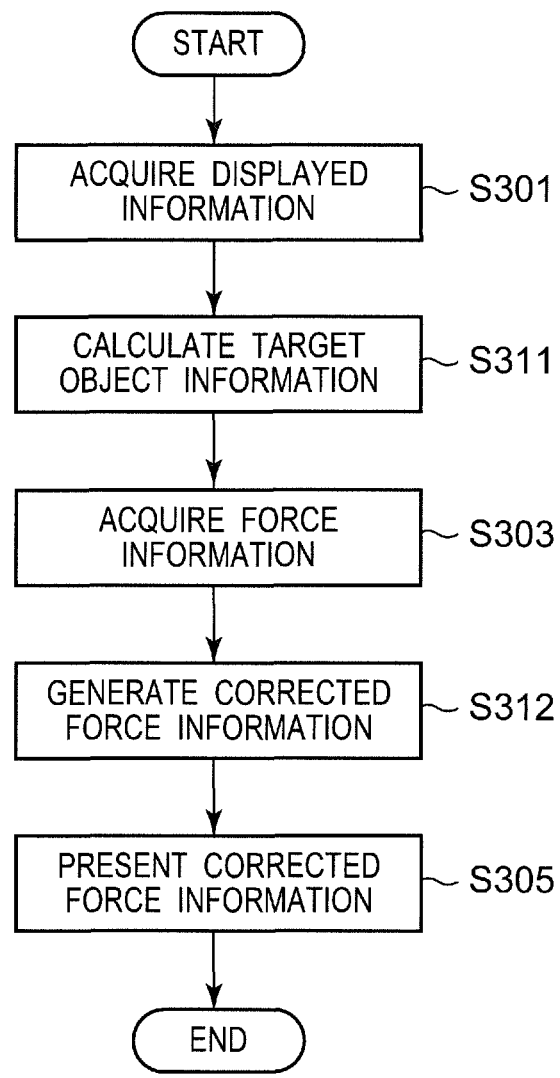
FIG. 25 is a flowchart of a force correction procedure of the master slave robot according to the second embodiment of the present disclosure.

An operation procedure of the master slave robot 100B according to the second embodiment is described with reference to the flowchart in FIG. 25.

An example of operation of the master slave robot 100B according to the second embodiment is similar to the operation illustrated in FIG. 17. Described with reference to FIG. 25 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S311.

Then, in step S311, the target object information calculation unit 123 matches the displayed information thus acquired to the reference picture information on how the material appears, and acquires target object information. The flow then proceeds to step S303.

Then, in step S303, the force information acquiring unit 116 acquires force information. The flow then proceeds to step S312.

Then, in step S312, the force information correcting unit 125 multiplies the force information acquired from the force information acquiring unit 116 and the target object information to generate corrected force information that is corrected to match the target object information. The flow then proceeds to step S305.

Then, in step S305, the force information presentation unit 115 generates a command value for the master arm 2 in accordance with the corrected force information acquired from the force information correcting unit 125, and causes the master arm 2 to present force by way of the master input/output IF 118 and the master motor driver 119 so that the force is presented to the operator 1.

The above difference in material is applicable also to a case where the material appears differently on the screen but the target objects are actually made of a same material at portions to and with which the slave arm 3 performs the task and is in contact. In this case, the force information correcting unit 125 corrects the force information on force to be fed back. In contrast, if appearance of the material is different on the screen and the target objects are made of actually different materials at the portions to and with which the slave arm 3 performs the task and is in contact, the force information correcting unit 125 does not correct force information on force to be fed back. The force information correcting unit 125 can select whether or not to correct force information in accordance with the material at the portion to be in contact with the slave arm 3 preregistered by the operator 1 or the like through the master input/output IF 118 or from a different database to the force information correcting unit 125.

Effects of Second Embodiment

Even when the operator 1 has prejudice different from the reality due to how a material of a target object appears on the screen, the force information correcting unit 125 corrects force information in accordance with target object information on how the material appears on the screen, and the force information presentation unit 115 performs force presentation. The operator 1 is thus capable of performing a task accurately. In other words, the operator 1 can perform the task efficiently by operating the master slave robot 100 while watching a motion picture, even when the material appears differently on the screen.

Third Embodiment

The first embodiment enables operation according to how a color of a target object appears on the screen by correction of force information according to a color depth of the target object. The third embodiment enables operation according to an assembling workload on the screen by correction of force information according to an assembling workload of a target object.

Figure 26:
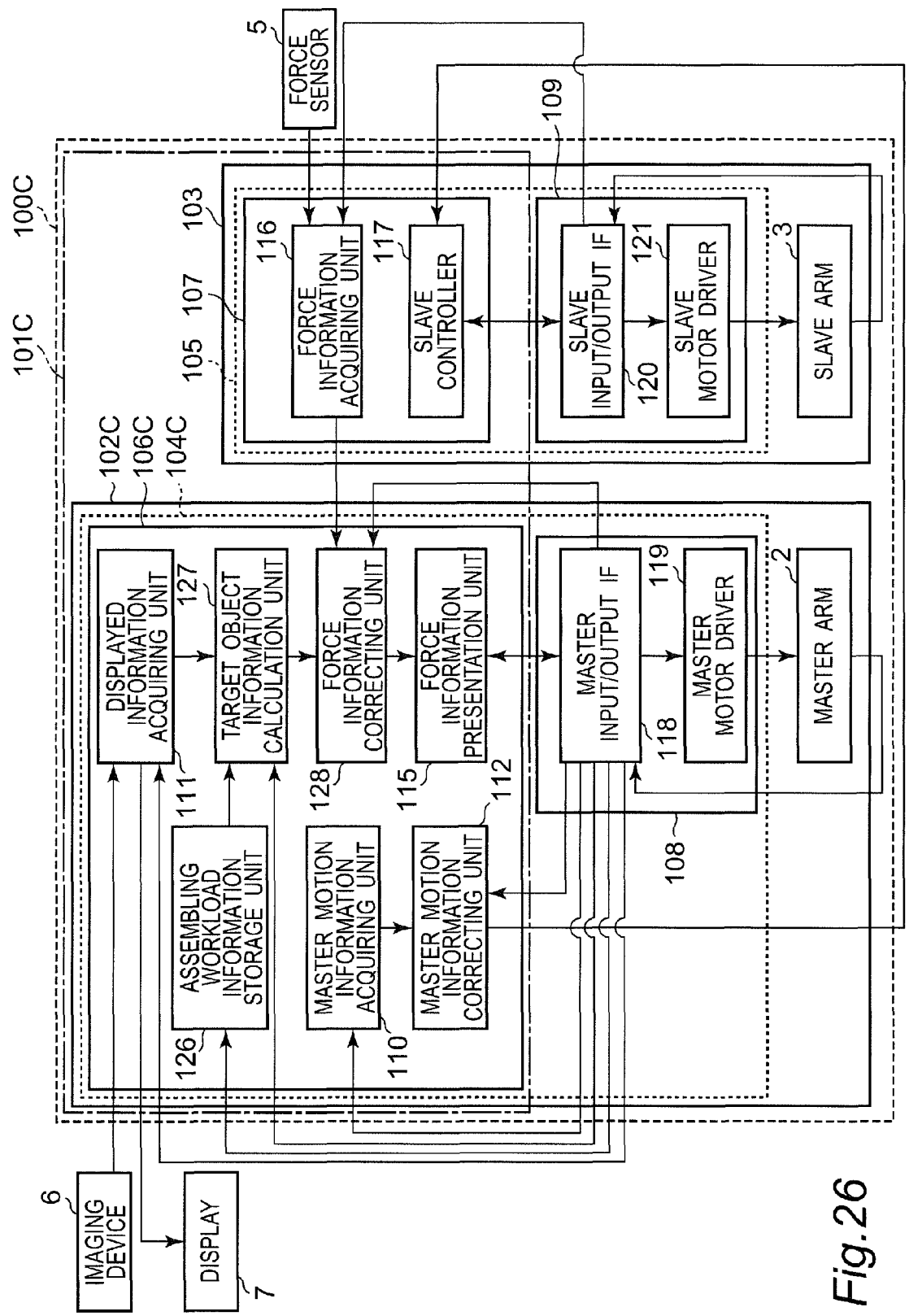
FIG. 26 is a block diagram of a master slave robot according to a third embodiment of the present disclosure.

Schematically described is a master slave robot 100C including a control apparatus 101C for the master slave robot 100C according to the third embodiment of the present disclosure. FIG. 26 is a block diagram of the master slave robot 1000 according to the third embodiment of the present disclosure. According to the third embodiment of the present disclosure, the master arm 2 and the master peripheral device 108, as well as the master motion information acquiring unit 110, the displayed information acquiring unit 111, the master motion information correcting unit 112, and the force information presentation unit 115 in a master control apparatus 106C included in a master robot 102C, and the slave robot 103 are configured similarly to those of the first embodiment. These common portions are denoted by the common reference signs and are not described repeatedly, and only different portions (such as an assembling workload information storage unit 126, a target object information calculation unit 127, and a force information correcting unit 128) are to be detailed below.

(Assembling Workload Information Storage Unit 126)

Figure 27A:
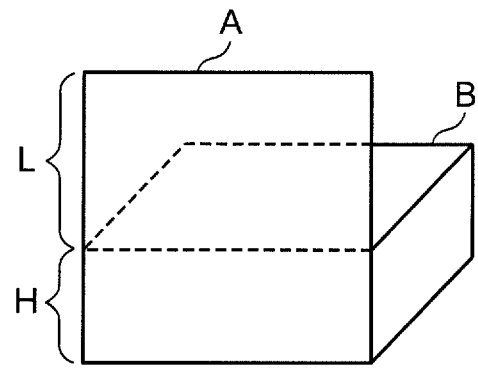
FIG. 27A is an explanatory view of an assembling workload of the master slave robot according to the third embodiment of the present disclosure.
Figure 27B:
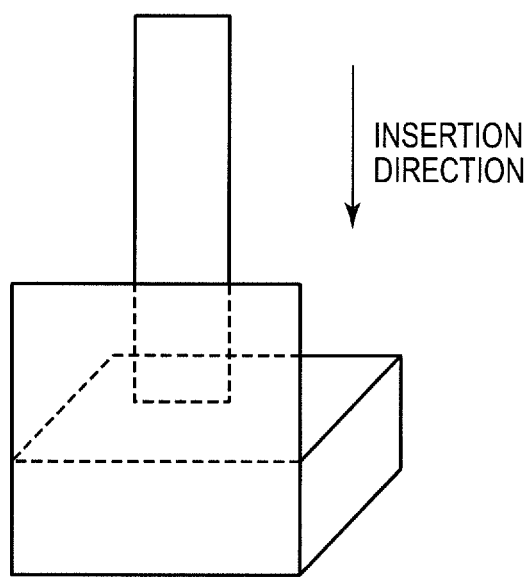
FIG. 27B is an explanatory view of an assembling workload of the master slave robot according to the third embodiment of the present disclosure.

The assembling workload information storage unit 126 stores actual target object assembling workload information on an assembling workload to an actual target object. An assembling workload is described with reference to FIG. 27A. When a target object shown in FIG. 27A has a portion "A" projected on the display 7 and a portion "B" hidden behind the portion "A" on the display 7, an assembling workload corresponds to a height "L" (e.g. 5 mm) of the portion "A". The length of the target object corresponds to a side "H" in FIG. 27A. In FIG. 27A, a target object to be attached is placed in contact with the portion "B" of a receiving object and an assembling task is performed. An alternative task includes insertion to the target object. In this case, as shown in FIG. 27B, a target object to be inserted is inserted to a receiving object in a direction (insertion direction) along which an assembling workload is applied. The assembling workload exemplifies an insertion amount in this case.

The assembling workload information storage unit 126 stores an assembling workload to the actual target object. The assembling workload information storage unit 126 receives the assembling workload of the actual target object from the operator 1 or the like through the master input/output IF 118 or from a different database. The assembling workload information storage unit 126 transmits assembling workload information stored therein to the target object information calculation unit 126.

(Target Object Information Calculation Unit 127)

The target object information calculation unit 127 receives imaged picture information, magnification percentage information, imaging device position information, and time information from the displayed information acquiring unit 111, and assembling workload information from the assembling workload information storage unit 126. The target object information calculation unit 127 regards the assembling workload information thus received as target object information.

FIG. 28 exemplifies target object information and time information.

The target object information calculation unit 127 transmits target object information thus calculated and time information to the force information correcting unit 128.

Applicable methods of calculating an assembling workload to the target object by the target object information calculation unit 127 include the picture decision as well as a method of calculating an assembling workload by the target object information calculation unit 127 with reference to component type numbers preregistered in a database, a method of calculating an assembling workload by the target object information calculation unit 127 with reference to component insertion amount information that can be acquired preliminarily, and a method of calculating an assembling workload by the target object information calculation unit 127 with reference to a database on tasks and components. For example, according to the method of calculating an assembling workload by the target object information calculation unit 123 with reference to the database on tasks and components, the target object information calculation unit 123 receives task identification information from the operator 1 or the like through the master input/output IF 118 or from a different database, and the target object information calculation unit 123 preliminarily stores correlation information between task identification information and assembling workloads or is capable of acquiring the correlation information from a different database preliminarily storing the correlation information. The target object information calculation unit 123 is thus capable of calculating an assembling workload from the task identification information thus received and the correlation information.

(Force Information Correcting Unit 128)

The force information correcting unit 128 receives target object information and time information from the target object information calculation unit 127, as well as force information and time information from the force information acquiring unit 116. The force information correcting unit 128 calculates corrected information from the target object information thus received, and multiplies the corrected information thus calculated and the force information to correct the force information.

Figure 29A:
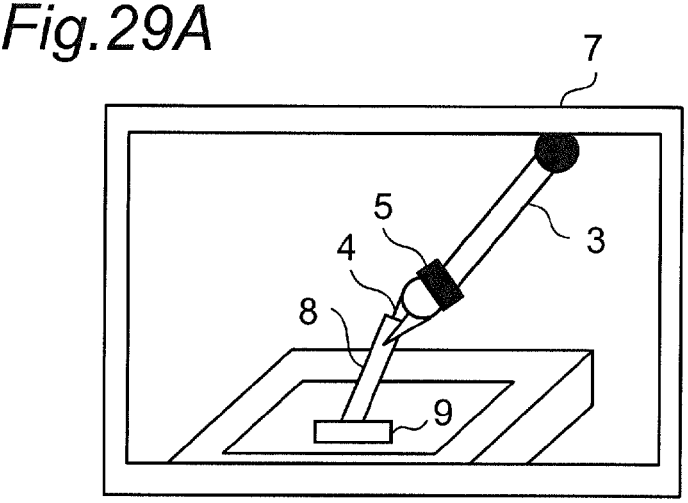
FIG. 29A is an explanatory view of correction of force information according to the target object information in the master slave robot according to the third embodiment of the present disclosure.
Figure 29B:
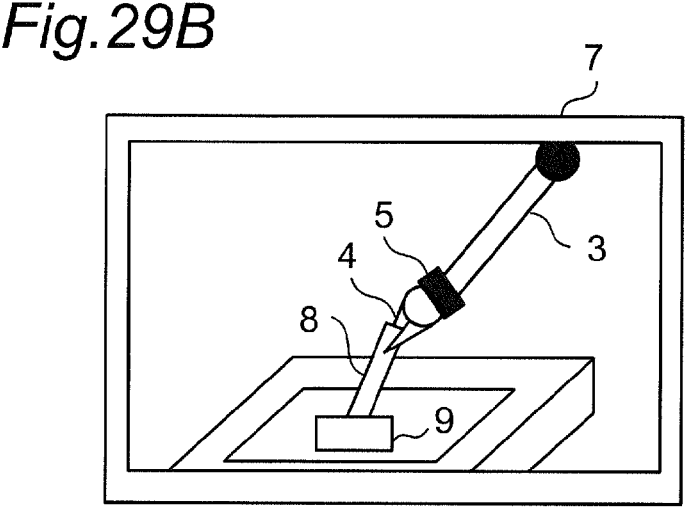
FIG. 29B is an explanatory view of correction of force information according to the target object information in the master slave robot according to the third embodiment of the present disclosure.
Figure 29C:
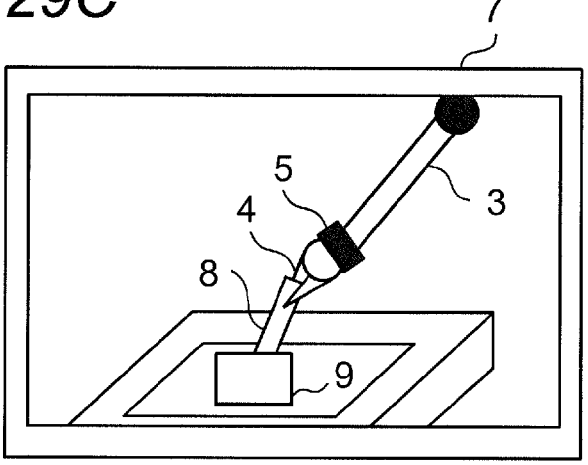
FIG. 29C is an explanatory view of correction of force information according to the target object information in the master slave robot according to the third embodiment of the present disclosure.
Figure 30A:
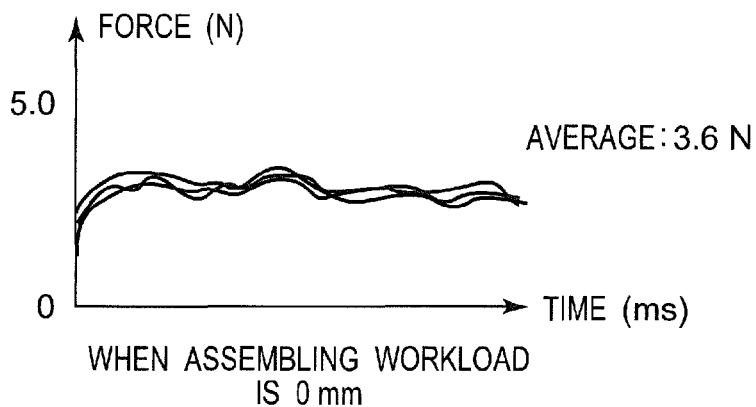
FIG. 30A is an explanatory view of correction of force information according to the target object information in the master slave robot according to the third embodiment of the present disclosure.
Figure 30B:
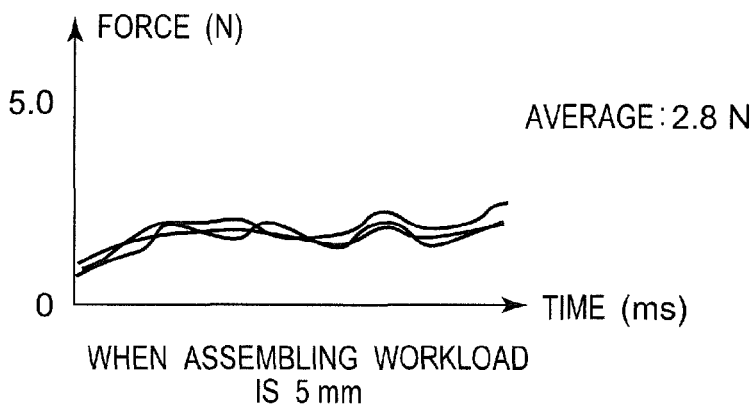
FIG. 30B is an explanatory view of correction of force information according to the target object information in the master slave robot according to the third embodiment of the present disclosure.
Figure 30C:
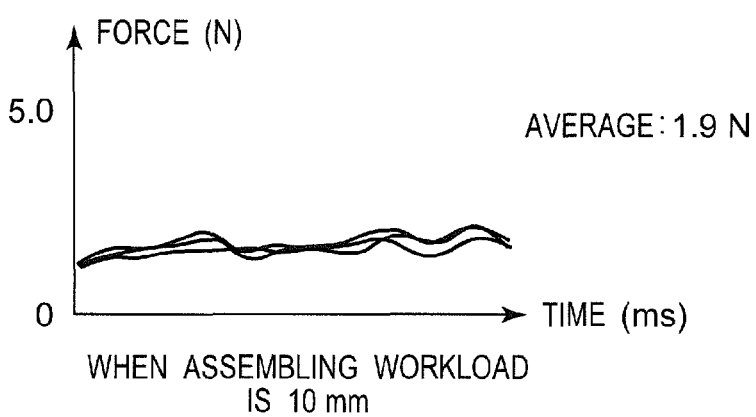
FIG. 30C is an explanatory view of correction of force information according to the target object information in the master slave robot according to the third embodiment of the present disclosure.

The force information correcting unit 128 corrects the force information such that the force information is decreased as the assembling workload to the target object is larger. When performing a task to an identical target object, the target object appears to be buried deeper in the receiving object as the assembling workload to the target object is larger. The operator 1 determines that the target object is lighter and regards the target object of the larger assembling workload as being lighter. In this manner, the operator 1 regards the target object differently depending on appearance if a different assembling workload is applied to the same target object. A case is exemplified with reference to FIGS. 29A to 29C. FIGS. 29A to 29C differ from one another in assembling workload to the insertion port 9. FIG. 29A shows the state where the assembling workload is 0 mm, FIG. 29B shows the state where the assembling workload is 5 mm, and FIG. 29C shows the state where the assembling workload is 10 mm. There was executed a test of inserting the fine component 8 to each of the insertion ports 9 that receive different assembling workloads on the screen. FIGS. 30A to 30C indicate results of measurement of force applied for insertion. FIGS. 30A, 30B, and 30C indicate the results for the assembling workloads of 0 mm, 5 mm, and 10 mm, respectively. Applied force with the assembling workload of 0 mm is 3.6 N on average, applied force with the assembling workload of 5 mm is 2.8 N on average, and applied force with the assembling workload of 10 mm is 1.9 N on average. The applied force is larger in the order of the assembling workloads of 0 mm, 5 mm, and 10 mm. The operator 1 determines that the target object is lighter when the assembling workload to the insertion port 9 is larger, and applies only small force to the target object.

The force information correcting unit 128 corrects the force information in accordance with the target object information so that equal force can be applied to the target object even when the assembling workload to the target object differs. When the assembling workload is larger, the force information correcting unit 128 corrects to decrease the force information. The operator 1 is thus guided to apply equal force to the target object regardless of the assembling workload to the target object.

Exemplified below is how the force information correcting unit 128 corrects force information. The force information correcting unit 128 initially divides the assembling workload information thus received by a sum of target object size information (the length of the side "H" in FIG. 27A) stored in a storage unit (now shown) in the force information correcting unit 128 and the assembling workload. The operator 1 inputs the size information through the master input/output IF 118. The force information correcting unit 128 performs division to calculate a ratio of the assembling workload to the target object. The force information correcting unit 128 calculates corrected information by subtracting the obtained ratio from one and multiplying the resulted value and a gain.

The following equation expresses the whole calculation. In this equation, "L" denotes assembling workload information, "H" denotes target object size information, "a" denotes a gain, and "a" denotes corrected information to be obtained.

$$a = \alpha\left(1 - \frac{L}{H+L}\right)$$

The operator 1 is capable of inputting the gain "a" through the master input/output IF 118 to the force information correcting unit 128. The force information correcting unit 128 calculates corrected force information by multiplying the corrected information thus calculated by the force information correcting unit 128 and the force information.

The force information correcting unit 128 transmits the corrected force information thus generated and time information to the force information presentation unit 115.

<Flowchart>

Figure 31:
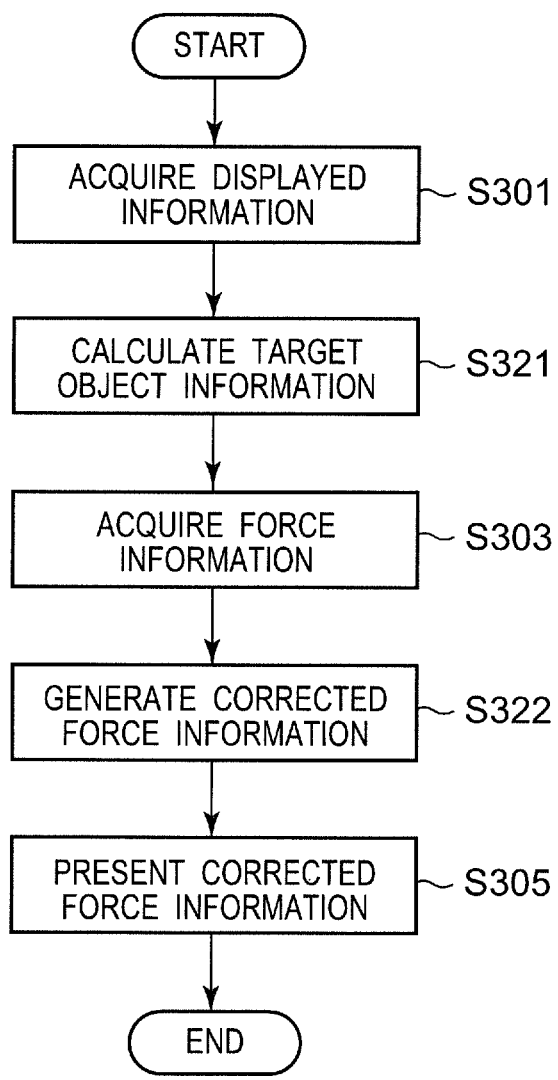
FIG. 31 is a flowchart of a force correction procedure of the master slave robot according to the third embodiment of the present disclosure.

An operation procedure of the master slave robot 100C according to the third embodiment is described with reference to the flowchart in FIG. 31.

An example of operation of the master slave robot 100C according to the third embodiment is similar to the operation illustrated in FIG. 17. Described with reference to FIG. 31 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S321.

Then, in step S321, the target object information calculation unit 127 calculates target object information from the displayed information and the assembling workload information thus acquired. The flow then proceeds to step S303.

Then, in step S303, the force information acquiring unit 116 acquires force information. The flow then proceeds to step S322.

Then, in step S322, the force information correcting unit 128 generates corrected force information that is obtained by correcting the force information acquired from the force information acquiring unit 116 in accordance with the target object information. The flow then proceeds to step S305.

Then, in step S305, the force information presentation unit 115 generates a command value for the master arm 2 in accordance with the corrected force information acquired from the force information correcting unit 128, and causes the master arm 2 to present force by way of the master input/output IF 118 and the master motor driver 119 so that the force is presented to the operator 1.

Effects of Third Embodiment

Even when the operator 1 has prejudice different from the reality due to an assembling workload to a target object, the force information correcting unit 125 corrects force information in accordance with target object information on the assembling workload, and the force information presentation unit 115 performs force presentation. The operator 1 is thus capable of performing a task accurately. In other words, the operator 1 can perform the task efficiently by operating the master slave robot 100 while watching a motion picture, even when appearance (the assembling workload) is different on the screen.

Fourth Embodiment

The first to third embodiments enable operation according to appearance on the screen by correction of force information according to target object information (a feature quantity of the target object information) on a color depth, a material, an assembling workload, or the like of a target object. The fourth embodiment includes selection of one of a plurality of target object information pieces when acquired and correction of force information.

Figure 32:
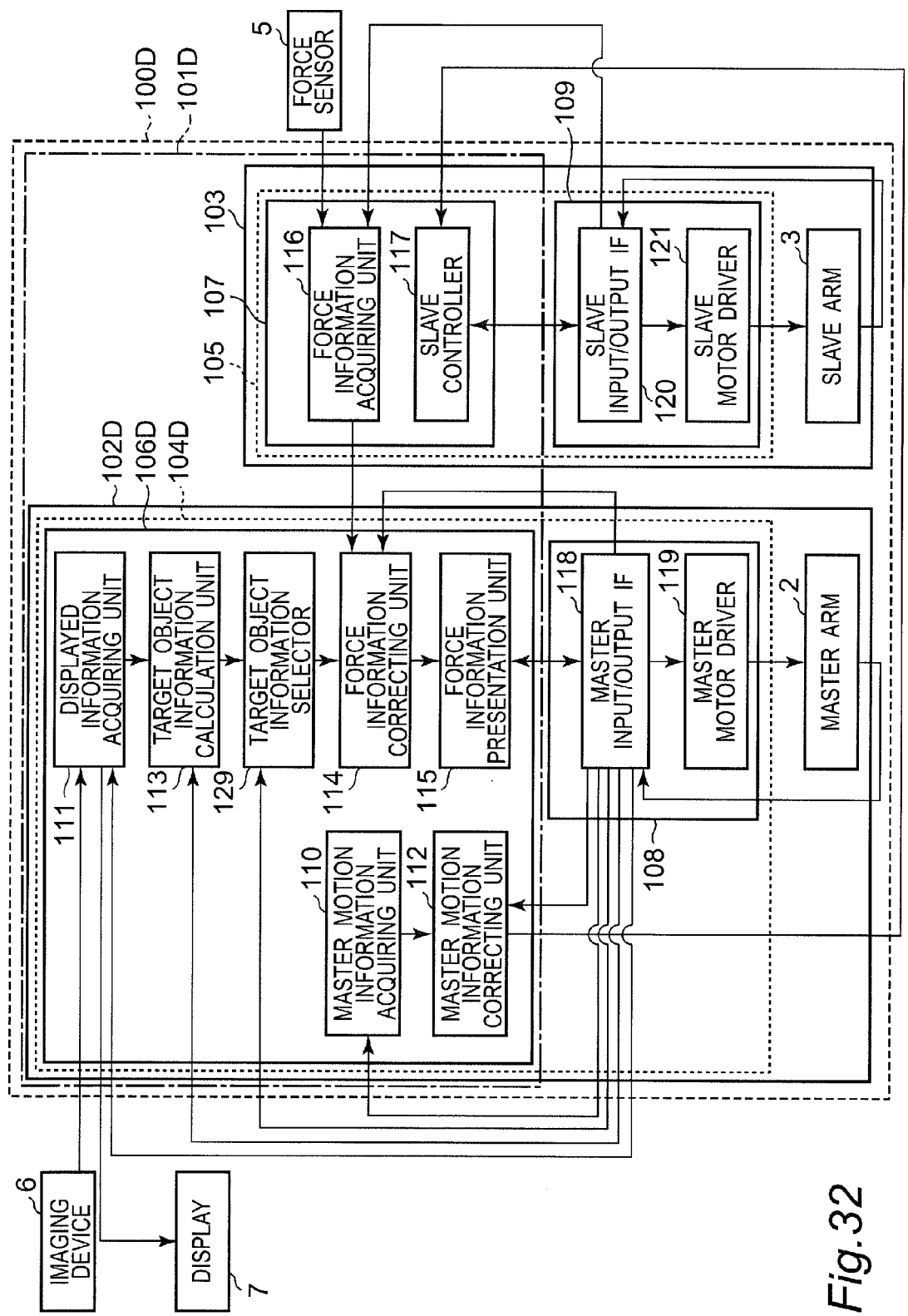
FIG. 32 is a block diagram of a master slave robot according to a fourth embodiment of the present disclosure.

Schematically described is a master slave robot 100D including a control apparatus 101D for the master slave robot 100D according to the fourth embodiment of the present disclosure. FIG. 32 is a block diagram of the master slave robot 100D according to the fourth embodiment of the present disclosure. According to the fourth embodiment of the present disclosure, the master arm 2 and the master peripheral device 108, as well as the master motion information acquiring unit 110, the displayed information acquiring unit 111, the master motion information correcting unit 112, the target object information calculation unit 113, the force information correcting unit 114, and the force information presentation unit 115 in a master control apparatus 106D included in a master robot 102D, and the slave robot 103 are configured similarly to those of the first embodiment. These common portions are denoted by the common reference signs and are not described repeatedly, and only different portions (such as a target object information selector 129) are to be detailed below.

(Target Object Information Selector 129)

The target object information selector 129 receives target object information and time information from the target object information calculation unit 113. When receiving a single target object information piece, the target object information selector 129 transmits the single target object information piece to the force information correcting unit 114. When receiving a plurality of target object information pieces, the target object information selector 129 selects one of the plurality of target object information pieces and transmits the target object information piece thus selected to the force information correcting unit 114.

Specified below is how the target object information selector 129 selects a target object information piece. The target object information selector 129 calculates corrected information related to each of the plurality of target object information pieces and selects the target object information piece related to the largest corrected information. This is because target object information related to the largest corrected information is assumed to be most influential. Alternatively, the operator 1 is capable of selecting a target object information piece through the master input/output IF 118.

According to another method of selecting a target object information piece by the target object information selector 129, the target object information selector 129 selects a target object information piece in accordance with a task. For example, the target object information selector 129 selects an assembling workload for an inserting task, and selects a material for a task of attaching sponge or the like. In this manner, the target object information selector 129 selects a target object information piece appropriate to a task. In this case, the target object information selector 129 receives a task from the operator 1 or the like through the master input/output IF 118 or from a different database. The target object information selector 129 selects a target object information piece related to the task thus received. Assume that the target object information selector 129 preliminarily stores correlation information between tasks and target object information. According to still another selection method, influential target object information pieces are preregistered to the target object information selector 129 depending on operators 1 and the target object information selector 129 selects one.

The target object information selector 129 transmits the target object information piece thus selected and time information to the force information correcting unit 114.

<Flowchart>

Figure 33:
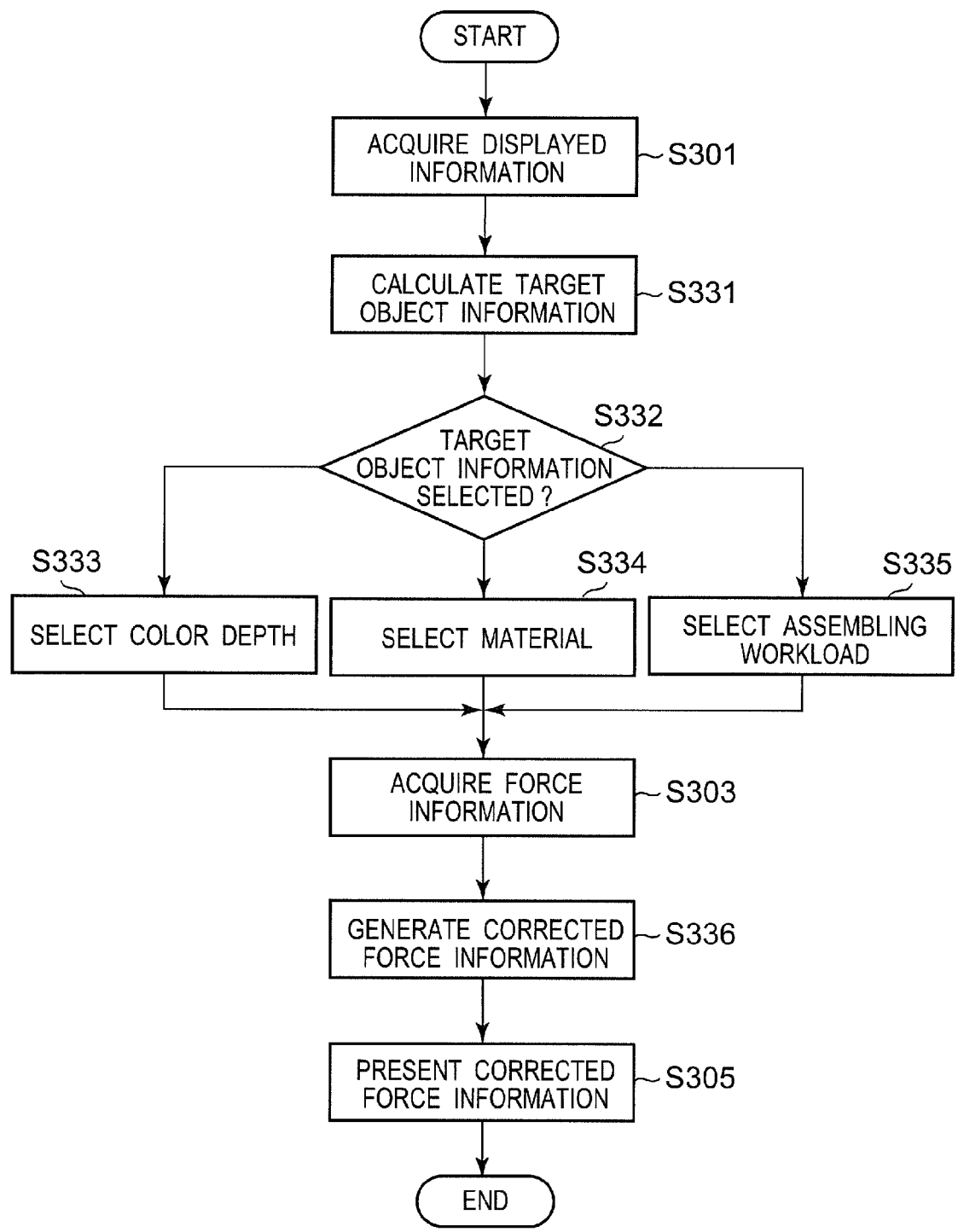
FIG. 33 is a flowchart of a force correction procedure of the master slave robot according to the fourth embodiment of the present disclosure.

An operation procedure of the master slave robot 100D according to the fourth embodiment is described with reference to the flowchart in FIG. 33.

An example of operation of the master slave robot 100D according to the fourth embodiment is similar to the operation illustrated in FIG. 17. Described with reference to FIG. 33 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S331.

Then, in step S331, the target object information calculation unit 113 calculates a plurality of target object information pieces from the displayed information thus acquired and the like. The flow then proceeds to step S332.

Then, in step S332, the target object information selector 129 selects one of the plurality of target object information pieces. The flow proceeds to step S333 if the target object information selector 129 selects a color depth. The flow proceeds to S334 if the target object information selector 129 selects a material. The flow proceeds to S335 if the target object information selector 129 selects an assembling workload.

In step S333, the target object information selector 129 transmits selected color information as target object information to the force information correcting unit 114. The flow then proceeds to step S303.

In step S334, the target object information selector 129 transmits selected material information as target object information to the force information correcting unit 114. The flow then proceeds to step S303.

In step S333, the target object information selector 129 transmits selected assembling workload information as target object information to the force information correcting unit 114. The flow then proceeds to step S303.

In step S303, the force information acquiring unit 116 acquires force information. The flow then proceeds to step S336.

In step S336, the force information correcting unit 114 generates corrected force information that is obtained by correcting the force information acquired from the force information acquiring unit 116 in accordance with the target object information. The flow then proceeds to step S305.

In step S305, the force information presentation unit 115 generates a command value for the master arm 2 in accordance with the corrected force information acquired from the force information correcting unit 114, and causes the master arm 2 to present force by way of the master input/output IF 118 and the master motor driver 119 so that the force is presented to the operator 1.

Effects of Fourth Embodiment

When the target object information calculation unit 113 calculates a plurality of target object information pieces, the target object information selector 129 selects the most influential target object information piece and the force information correcting unit 114 corrects force information. The force information can be corrected effectively and the force information presentation unit 115 is capable of performing force presentation. The operator 1 can thus perform a task accurately.

Fifth Embodiment

The first to third embodiments enable operation according to appearance on the screen by correction of force information according to target object information on a color depth, a material, an assembling workload, or the like of a target object. The fourth embodiment includes selection of one of a plurality of target object information pieces when acquiring the plurality of target object information pieces and correction of force information. The fifth embodiment includes synthesis of a plurality of target object information pieces when acquiring the plurality of target object information pieces into a single target object information piece and correction of force information.

Figure 34:
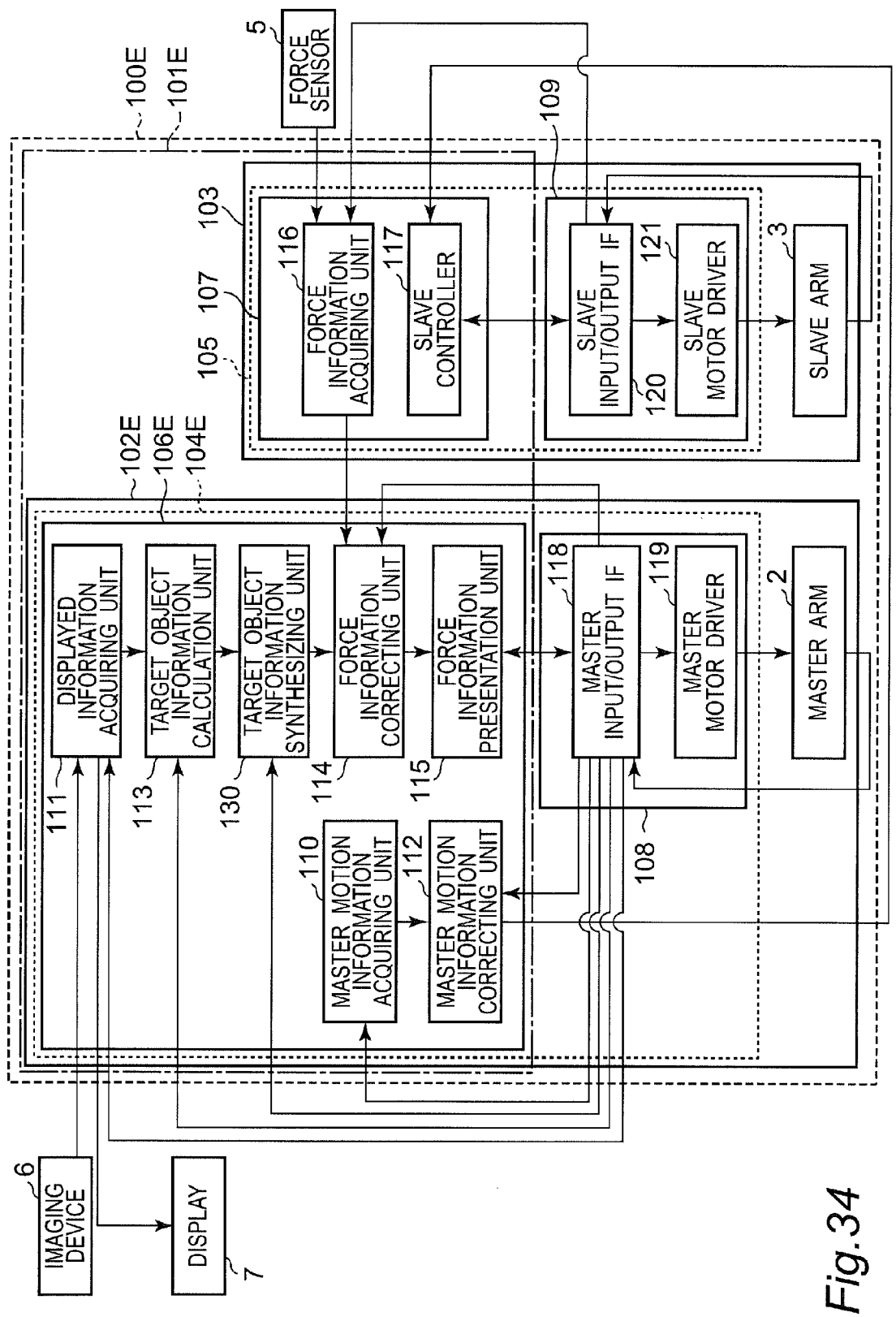
FIG. 34 is a block diagram of a master slave robot according to a fifth embodiment of the present disclosure.

Schematically described is a master slave robot 100E including a control apparatus 101E for the master slave robot 100E according to the fifth embodiment of the present disclosure. FIG. 34 is a block diagram of the master slave robot 100E according to the fifth embodiment of the present disclosure. According to the fifth embodiment of the present disclosure, the master arm 2 and the master peripheral device 108, as well as the master motion information acquiring unit 110, the displayed information acquiring unit 111, the master motion information correcting unit 112, the target object information calculation unit 113, the force information correcting unit 114, and the force information presentation unit 115 in a master control apparatus 106E included in a master robot 102E, and the slave robot 103 are configured similarly to those of the first embodiment. These common portions are denoted by the common reference signs and are not described repeatedly, and only different portions (such as a target object information synthesizing unit 130) are to be detailed below.

(Target Object Information Synthesizing Unit 130)

The target object information synthesizing unit 130 receives target object information and time information from the target object information calculation unit 113. When receiving a single target object information piece, the target object information synthesizing unit 130 transmits the single target object information piece to the force information correcting unit 114. When receiving a plurality of target object information pieces, the target object information synthesizing unit 130 synthesizes the plurality of target object information pieces into a single target object information piece and transmits the single target object information piece thus synthesized to the force information correcting unit 114.

Specified below is how the target object information synthesizing unit 130 synthesizes target object information pieces. The target object information synthesizing unit 130 calculates corrected information related to each of the plurality of target object information pieces and synthesizes the corrected information pieces with weighting. Assume that "c" denotes corrected information related to color depth information, "m" denotes corrected information related to material information, and "h" denotes corrected information related to assembling workload information. Synthesized corrected information denoted by "s" is expressed by the following equation.

$s = \alpha c + \beta m + \gamma h$ $\alpha + \beta + \gamma = 1$

Gains "$\alpha$", "$\beta$", and "$\gamma$" are fixed in accordance with size ratios of "c", "m", and "h", for example. These gains can have any values, and the operator 1 is capable of inputting the gains through the master input/output IF 118.

The target object information synthesizing unit 130 transmits the target object information and the corrected information thus synthesized, as well as time information, to the force information correcting unit 114.

<Flowchart>

Figure 35:
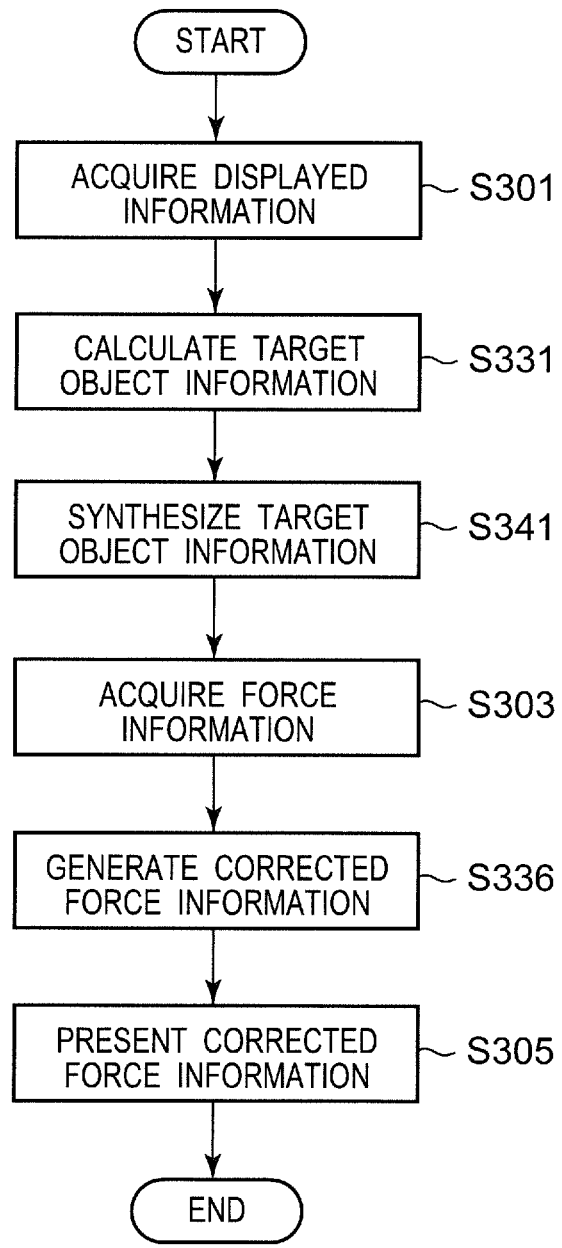
FIG. 35 is a flowchart of a force correction procedure of the master slave robot according to the fifth embodiment of the present disclosure.

An operation procedure of the master slave robot 100E according to the fifth embodiment is described with reference to the flowchart in FIG. 35.

An example of operation of the master slave robot 100E according to the fifth embodiment is similar to the operation illustrated in FIG. 17. Described with reference to FIG. 35 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S331.

Then, in step S331, the target object information calculation unit 113 calculates a plurality of target object information pieces from the displayed information thus acquired and the like. The flow then proceeds to step S341.

Then, in step S341, the target object information synthesizing unit 130 synthesizes the plurality of target object information pieces into a single target object information piece. The flow then proceeds to step S303.

Then, in step S303, the force information acquiring unit 116 acquires force information. The flow then proceeds to step S336.

Then, in step S336, the force information correcting unit 114 generates corrected force information that is obtained by correcting the force information acquired from the force information acquiring unit 116 in accordance with the target object information. The flow then proceeds to step S305.

Then, in step S305, the force information presentation unit 115 generates a command value for the master arm 2 in accordance with the corrected force information acquired from the force information correcting unit 114, and causes the master arm 2 to present force by way of the master input/output IF 118 and the master motor driver 119 so that the force is presented to the operator 1.

Effects of Fifth embodiment

When the target object information calculation unit 113 calculates a plurality of target object information pieces, the target object information synthesizing unit 130 synthesizes the plurality of target object information pieces and then the force information correcting unit 114 corrects force information. The force information correcting unit 114 corrects the force information in accordance with all elements of the target object information pieces and the force information presentation unit 115 performs force presentation. The operator 1 can thus perform a task accurately.

Sixth Embodiment

The first to third embodiments enable operation according to appearance on the screen by correction of force information according to target object information on a color depth, a material, an assembling workload, or the like of a target object. The sixth embodiment includes acquisition of these target object information pieces, change of a correction method upon change in magnification percentage, and correction of force information.

Figure 36:
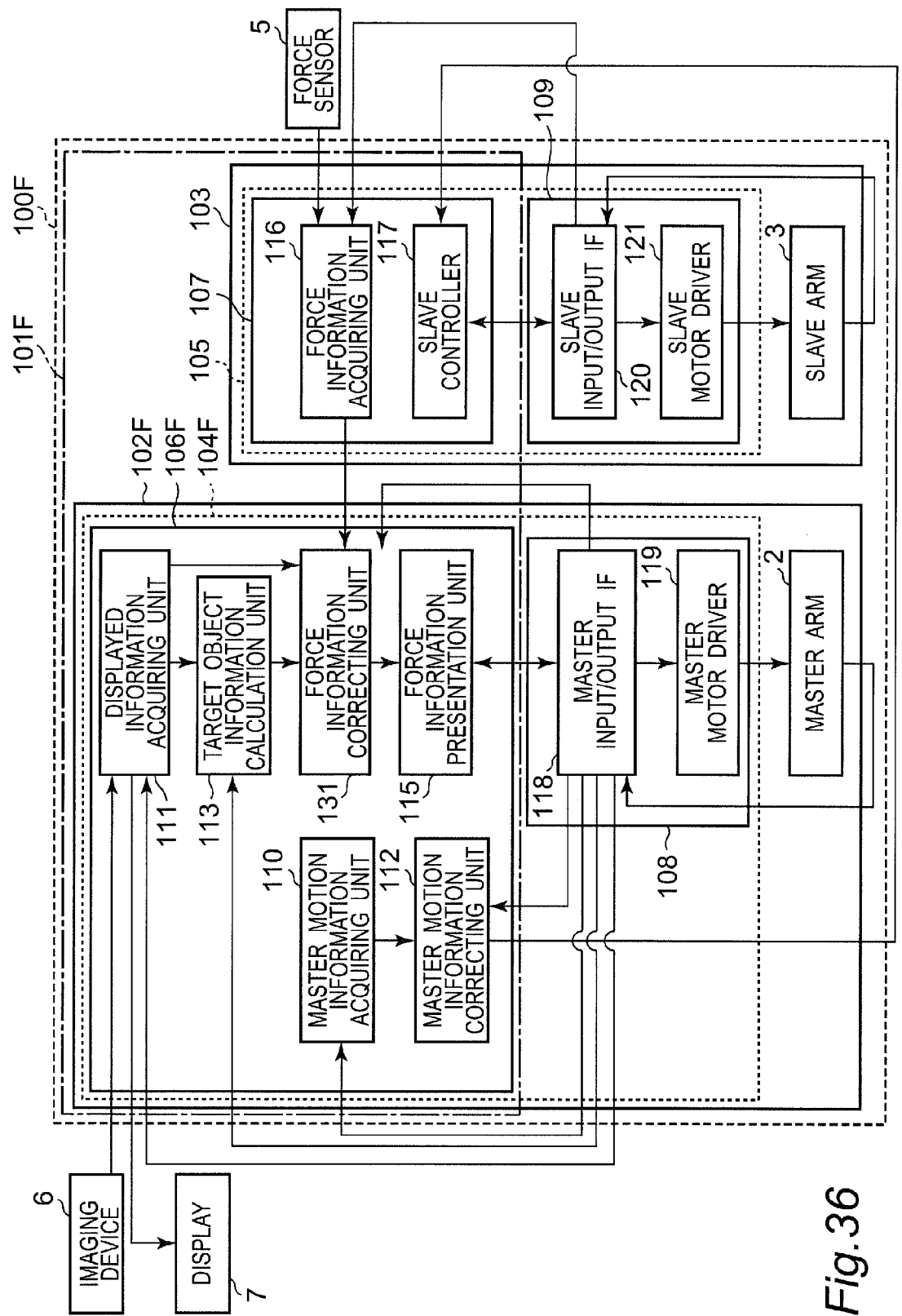
FIG. 36 is a block diagram of a master slave robot according to a sixth embodiment of the present disclosure.

Schematically described is a master slave robot 100F including a control apparatus 101F for the master slave robot 100F according to the sixth embodiment of the present disclosure. FIG. 36 is a block diagram of the master slave robot 100F according to the sixth embodiment of the present disclosure. According to the sixth embodiment of the present disclosure, the master arm 2 and the master peripheral device 108, as well as the master motion information acquiring unit 110, the displayed information acquiring unit ill, the master motion information correcting unit 112, the target object information calculation unit 113, and the force information presentation unit 115 in a master control apparatus 106F included in a master robot 102F, and the slave robot 103 are configured similarly to those of the first embodiment. These common portions are denoted by the common reference signs and are not described repeatedly, and only different portions (such as a force information correcting unit 131) are to be detailed below.

(Force Information Correcting Unit 131)

The force information correcting unit 131 replaces the force information correcting unit 114 according to the first embodiment and is included in the master control apparatus 106F. In addition to the functions of the force information correcting unit 114 according to the first embodiment, the force information correcting unit 131 has a function of correcting force information in accordance with magnification percentage information.

The force information correcting unit 131 receives magnification percentage information and time information from the displayed information acquiring unit 111. The force information correcting unit 131 corrects force information in accordance with target object information as well as corrects the force information in accordance with the magnification percentage information thus acquired. According to a method of correcting force information in accordance with magnification percentage information by the force information correcting unit 131, the force information correcting unit 131 corrects such that a corrected amount for correction of corrected information calculated from target object information is increased as the magnification percentage information is larger. If magnification percentage information is larger, target object information on a color, a material, an assembling workload, or the like appears more clearly. The operator 1 thus has more prejudice due to such target object information. In contrast, if magnification percentage information is smaller, target object information appears less clearly. The operator 1 thus has less prejudice due to such target object information.

Figure 37A:
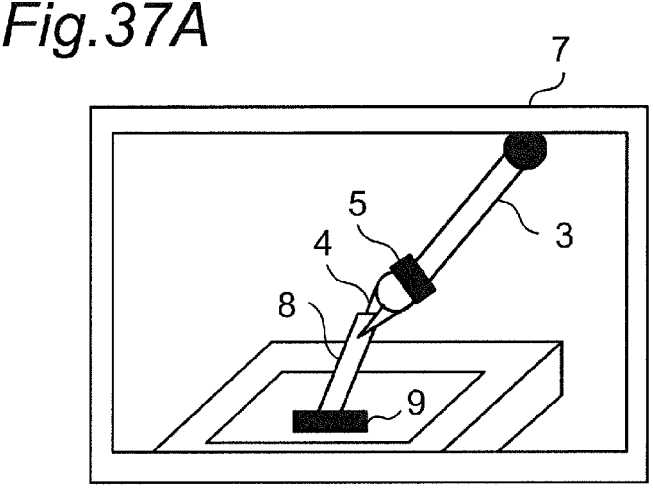
FIG. 37A is an explanatory view of correction of force information according to magnification percentage information in the master slave robot according to the sixth embodiment of the present disclosure.
Figure 37B:
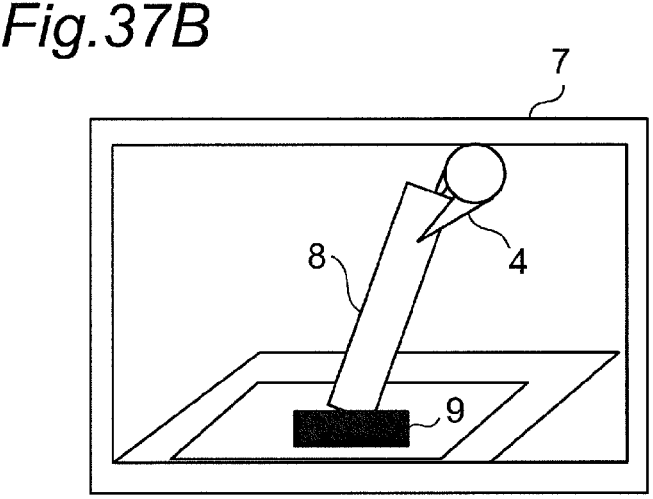
FIG. 37B is an explanatory view of correction of force information according to magnification percentage information in the master slave robot according to the sixth embodiment of the present disclosure.
Figure 37C:
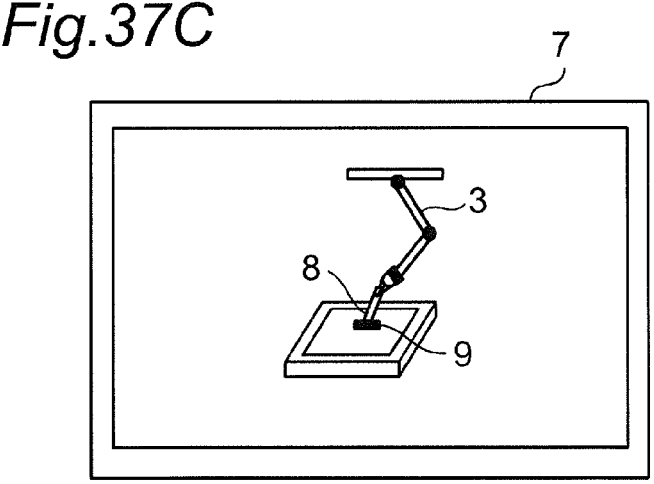
FIG. 37C is an explanatory view of correction of force information according to magnification percentage information in the master slave robot according to the sixth embodiment of the present disclosure.
Figure 38A:
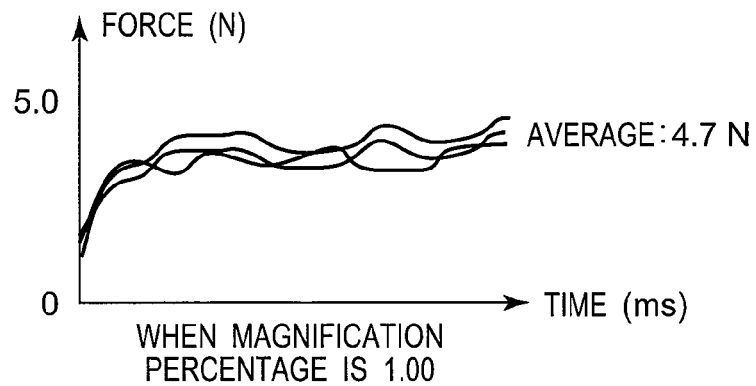
FIG. 38A is an explanatory view of correction of force information according to magnification percentage information in the master slave robot according to the sixth embodiment of the present disclosure.
Figure 38B:
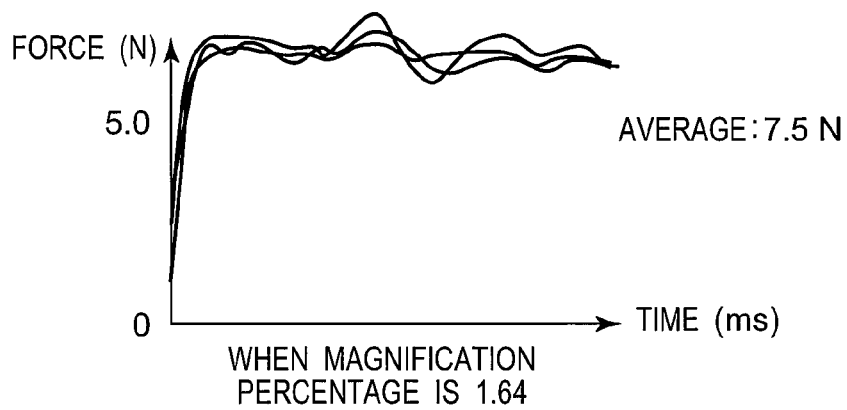
FIG. 38B is an explanatory view of correction of force information according to magnification percentage information in the master slave robot according to the sixth embodiment of the present disclosure.
Figure 38C:
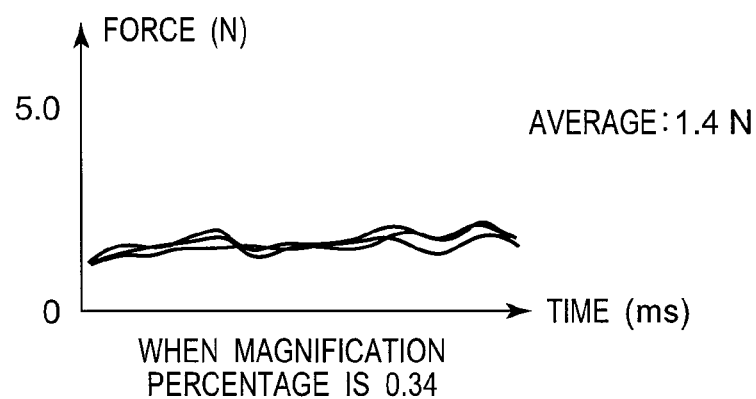
FIG. 38C is an explanatory view of correction of force information according to magnification percentage information in the master slave robot according to the sixth embodiment of the present disclosure.

Exemplified with reference to FIGS. 37A to 37C is change in magnification percentage information in a case where target object information relates to a color depth. FIGS. 37A to 37C differ from one another in magnification percentage information on the insertion port 9. FIG. 37A shows the state where the magnification percentage is 1.00, FIG. 37B shows the state where the magnification percentage is 1.64, and FIG. 37C shows the state where the magnification percentage is 0.34. There was executed a test of inserting the fine component 8 to each of the insertion ports 9 with reference to the screens different in magnification percentage. FIGS. 38A to 38C indicate results of measurement of force applied for insertion. FIGS. 38A, 38B, and 38C indicate the results for the magnification percentages of 1.00, 1.64, and 0.34, respectively. Applied force with the magnification percentage 1.00 is 4.7 N on average, applied force with the magnification percentage 1.64 is 7.5 N on average, and applied force with the magnification percentage 0.34 is 1.4 N on average. The applied force is larger in the order of the magnification percentages of 1.64, 1.00, and 0.34. This is because color depth information appears more clearly and is more influential with a larger magnification percentage. In this case, the operator 1 determines that the target object is heavier and applies larger force.

In this manner, the force information correcting unit 131 changes the corrected amount of the corrected force information in accordance with the magnification percentage information so that equal force can be applied to the target object even when the magnification percentage differs. The force information correcting unit 131 increases the corrected amount if the magnification percentage is larger. In contrast, the force information correcting unit 131 decreases the corrected amount if the magnification percentage is smaller. The operator 1 is thus guided to apply equal force to the target object regardless of the magnification percentage.

Described below is a specific correction method by the force information correcting unit 131. The force information correcting unit 131 changes, in accordance with the magnification percentage information, the corrected amount of the corrected information generated from the target object information. A method of correcting force information by the force information correcting unit 131 is exemplified with reference to a case of multiplying corrected information and the force information. The force information correcting unit 131 corrects the value of the corrected information to approximate 1 when the magnification percentage information is less than 1. In contrast, when the magnification percentage information is more than 1, the force information correcting unit 131 increases the value of the corrected information if the corrected information is more than 1, and decreases the value of the corrected information if the corrected information is equal to or less than 1. The operator 1 inputs a changed amount of the corrected amount through the master input/output IF 118 to the force information correcting unit 131.

The magnification percentage is adjusted such that the actual target object is equal in size to the target object imaged and projected on the screen. The magnification percentage in this case is set to 1.

The reference magnification percentage is set to 1 such that the actual target object is equal in size to the target object projected on the screen. It is possible to set the reference magnification percentage to 1 at a different magnification percentage. For example, by setting the least magnification percentage to 1, the force information correcting unit 131 corrects to increase force when the target object is likely to break and cannot receive a large load. This effectively prevents application of excessive force. Alternatively, by setting the most magnification percentage to 1, the force information correcting unit 131 corrects to decrease force when the task requires large force. The operator 1 is then effectively guided to apply larger force. The operator 1 or the like can input through the master input/output IF 118 to change the reference value in accordance with a task or a target object in these manners.

The force information correcting unit 131 transmits the corrected force information thus generated and time information to the force information presentation unit 115.

<Flowchart>

Figure 39:
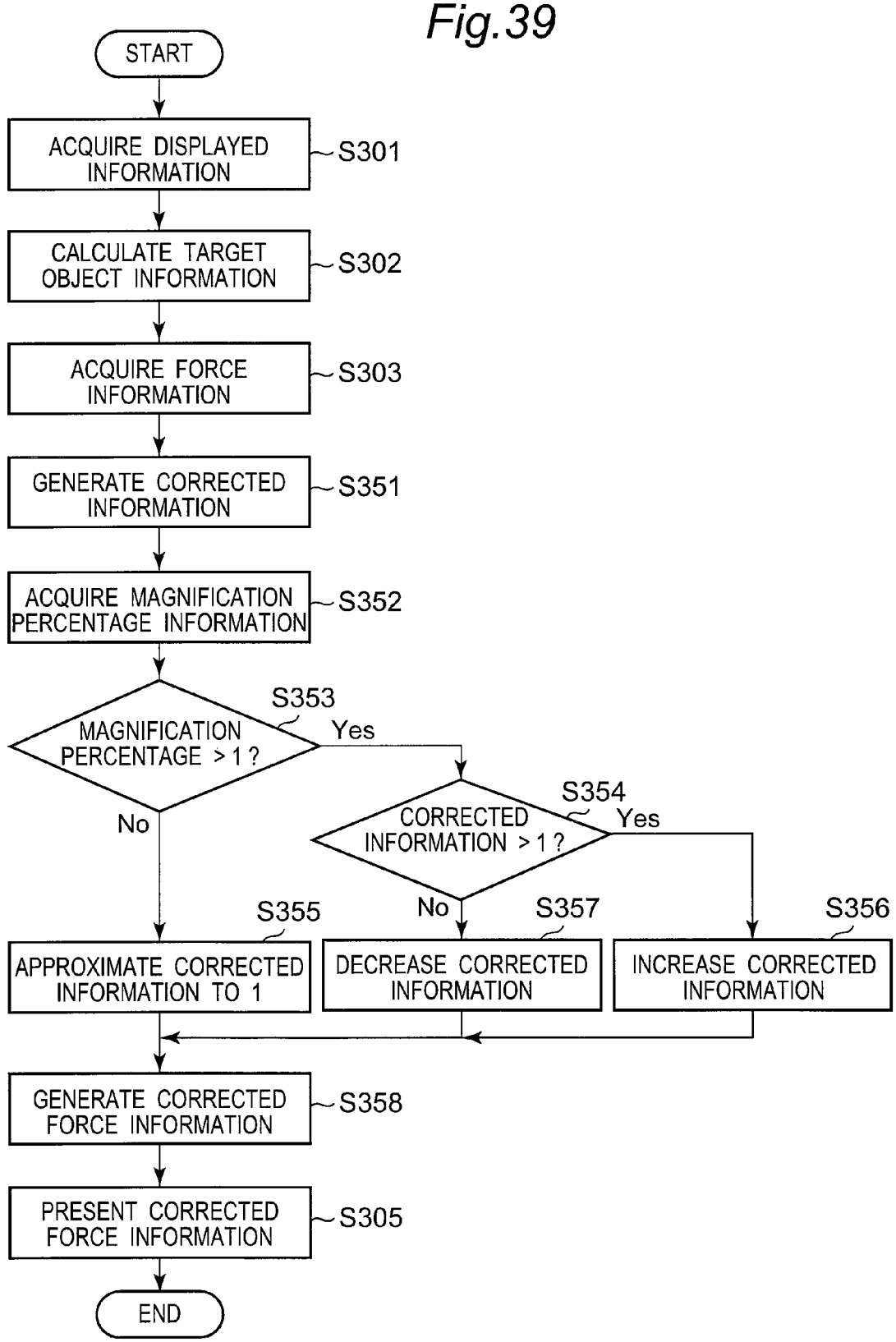
FIG. 39 is a flowchart of a force correction procedure of the master slave robot according to the sixth embodiment of the present disclosure.

An operation procedure of the master slave robot 100F according to the sixth embodiment is described with reference to the flowchart in FIG. 39.

An example of operation of the master slave robot 100F according to the sixth embodiment is similar to the operation illustrated in FIG. 17. Described with reference to FIG. 39 are force information acquisition in step S204, corrected force information generation in step S205, and force presentation in step S206 in the flowchart in FIG. 17.

Initially in step S301, the displayed information acquiring unit 111 acquires displayed information. The flow then proceeds to step S302.

Then, in step S302, the target object information calculation unit 113 acquires target object information from the displayed information thus acquired. The flow then proceeds to step S303.

Then, instep S303, the force information acquiring unit 116 acquires force information. The flow then proceeds to step S351.

Then, in step S351, the force information correcting unit 131 generates corrected information from the target object information. The flow then proceeds to step S352.

Then, in step S352, the force information correcting unit 131 acquires magnification percentage information. The flow then proceeds to step S353.

Then, in step S353, the force information correcting unit 131 compares to find whether or not the magnification percentage information thus acquired is more than 1. The flow proceeds to step S354 if the magnification percentage information is more than 1. The flow proceeds to step S355 if the magnification percentage information is equal to or less than 1.

In step S354, the force information correcting unit 131 compares to find whether or not the corrected information thus generated is more than 1. The flow proceeds to step S356 if the corrected information is more than 1. The flow proceeds to step S357 if the corrected information is equal to or less than 1.

In step S355, the force information correcting unit 131 further corrects such that the value of the corrected information approximates 1 in accordance with the magnification percentage information. The flow then proceeds to step S357.

In step S356, the force information correcting unit 131 further corrects to increase the value of the corrected information in accordance with the magnification percentage information. The flow then proceeds to step S357.

Instep S357, the force information correcting unit 131 further corrects to decrease the value of the corrected information in accordance with the magnification percentage information. The flow then proceeds to step S358.

Then, in step S358, the force information correcting unit 131 multiplies the corrected information thus generated and the force information to generate corrected force information. The flow then proceeds to step S305.

In step S305, the force information presentation unit 115 generates a command value for the master arm 2 in accordance with the corrected force information acquired from the force information correcting unit 131, and causes the master arm 2 to present force byway of the master input/output IF 118 and the master motor driver 119 so that the force is presented to the operator 1.

Effects of Sixth Embodiment

The force information correcting unit 131 corrects the force information in accordance with magnification percentage information. The force information can be corrected in accordance with how the target object actually appears to the operator 1 and the operator 1 can thus perform a task accurately.

Seventh Embodiment

The first to sixth embodiments enable operation according to target object information by correction of force information. The seventh embodiment enables operation according to target object information by correction of force information on force to be fed back as well as correction of motion information.

Figure 40:
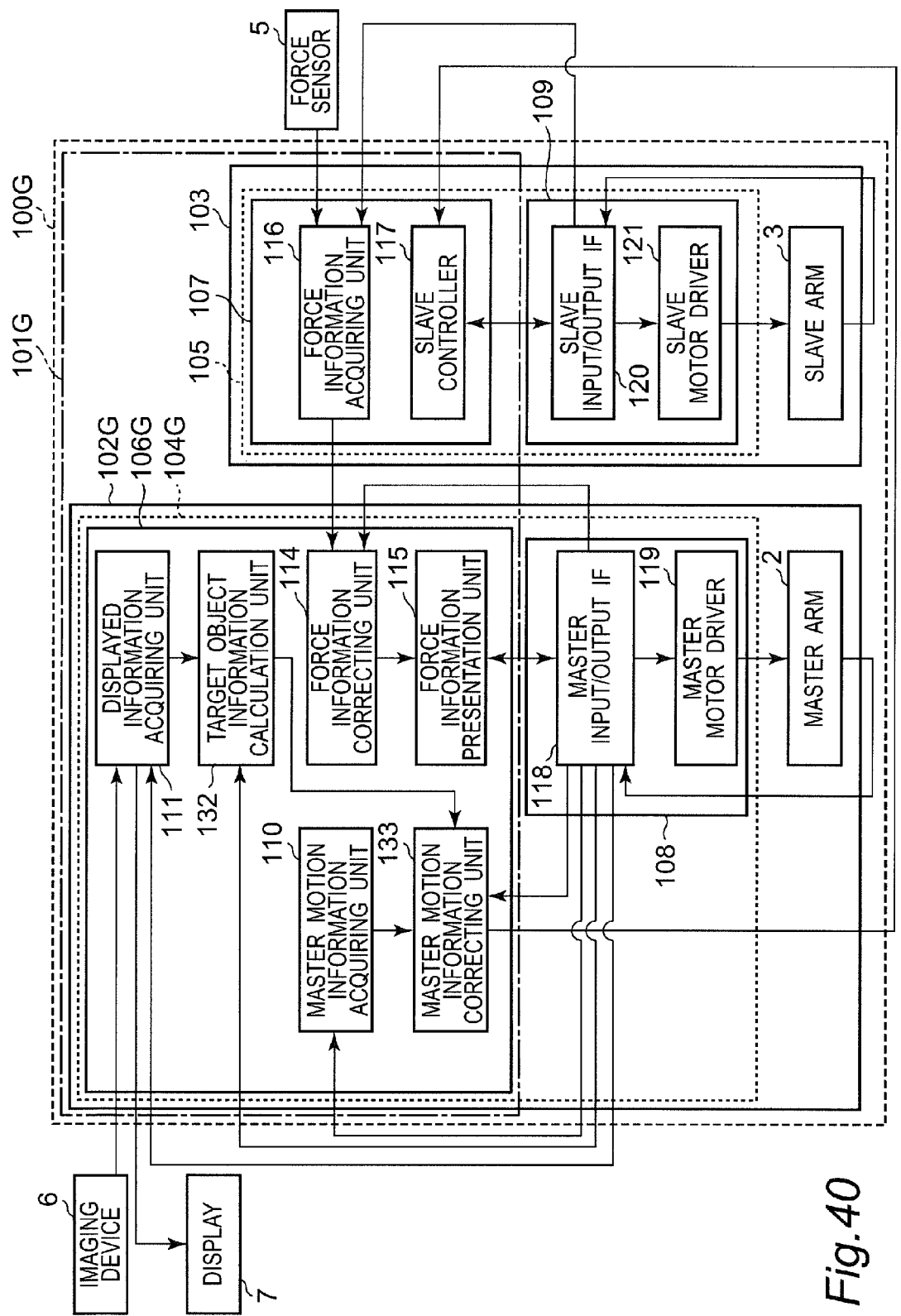
FIG. 40 is a block diagram of a master slave robot according to a seventh embodiment of the present disclosure.

Schematically described is a master slave robot 100G including a control apparatus 101G for the master slave robot 100G according to the seventh embodiment of the present disclosure. FIG. 40 is a block diagram of the master slave robot 100G according to the seventh embodiment of the present disclosure. According to the seventh embodiment of the present disclosure, the master arm 2 and the master peripheral device 108, as well as the master motion information acquiring unit 110, the displayed information acquiring unit 111, the force information correcting unit 114, and the force information presentation unit 115 in a master control apparatus 106C included in a master robot 102G, and the slave robot 103 are configured similarly to those of the first embodiment. These common portions are denoted by the common reference signs and are not described repeatedly, and only different portions (such as a target object information calculation unit 132 and a master motion information correcting unit 133) are to be detailed below.

A method of correcting force information on force to be fed back by the force information correcting unit 114 is also similar to that of the first embodiment. Detailed below is an additional method of correcting motion information.

(Target Object Information Calculation Unit 132)

The target object information calculation unit 132 replaces the target object information calculation unit 113 according to the first embodiment and is included in a control apparatus 104G. The target object information calculation unit 113 according to the first embodiment transmits calculated target object information and time information to the force information correcting unit 114, whereas the target object information calculation unit 132 transmits the same to the master motion information correcting unit 133.

(Master Motion Information Correcting Unit 133)

The master motion information correcting unit 133 replaces the master motion information correcting unit 112 according to the first embodiment and is included in the control apparatus 104G. In addition to the functions of the master motion information correcting unit 112 according to the first embodiment, the master motion information correcting unit 133 has a function of correcting master motion information in accordance with target object information.

The master motion information correcting unit 133 receives target object information and time information from the target object information calculation unit 132, as well as master motion information and time information from the master motion information acquiring unit 110. The master motion information correcting unit 133 corrects the master motion information in accordance with the target object information thus acquired.

According to a method of correcting master motion information by the master motion information correcting unit 133, the master motion information correcting unit 133 corrects such that the master motion information is decreased as color depth information indicates a deeper color. This corresponds to the fact that the force information correcting unit 114 according to the first embodiment corrects force information such that the force information is increased as target object information includes a deeper color. In other words, the master motion information is corrected in an inverted manner to correction of force information. When the color is deeper, the force information correcting unit 114 according to the first embodiment corrects to increase the force information. The operator 1 is thus guided to apply equal force to the target object regardless of color depth information. When the color is deeper, the master motion information correcting unit 133 corrects to decrease master motion information so that force applied to the target object is controlled to be equal regardless of color depth information. Similarly, when the color is lighter, the master motion information correcting unit 133 corrects to increase the master motion information so that force applied to the target object is controlled to be equal regardless of the color depth information. The master motion information correcting unit 133 corrects master motion information in accordance with other target object information also in an inverted manner to correction of force information, to achieve similar effects.

<Flowchart>

Figure 41:
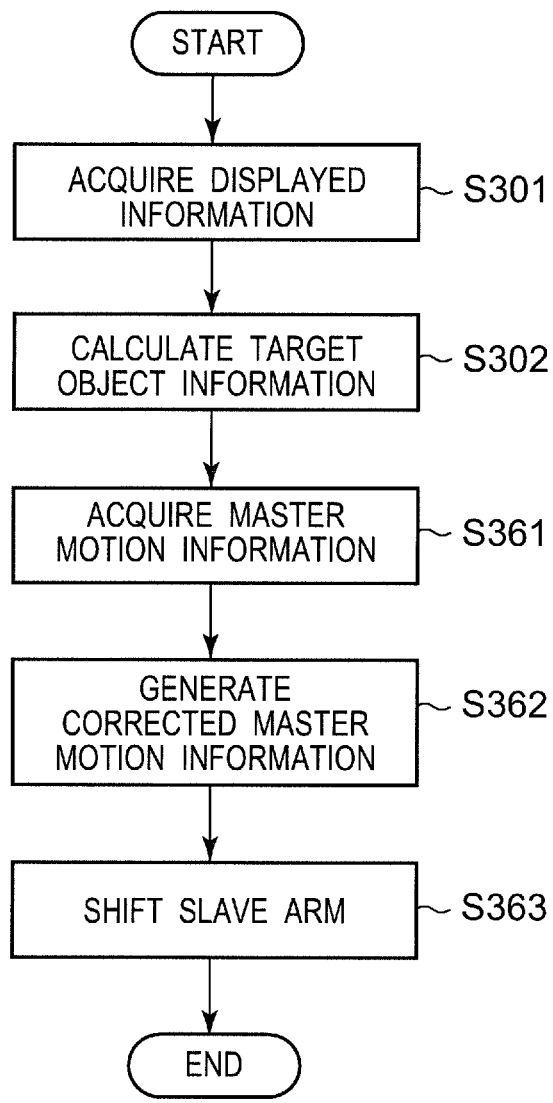
FIG. 41 is a flowchart of a force correction procedure of the master slave robot according to the seventh embodiment of the present disclosure.

An operation procedure of the master slave robot 100G according to the seventh embodiment is described with reference to the flowchart in FIG. 41.

An example of operation of the master slave robot 100G according to the seventh embodiment is similar to the operation illustrated in FIG. 17. Described with reference to FIG. 41 are manipulation of the master arm by the operator in step S201, corrected master motion information generation in step S202, and shift of the slave arm in step S203 in the flowchart in FIG. 17.

Initially in step S301, the displayed information acquiring unit 111 acquires displayed information. The flow then proceeds to step S302.

Then, in step S302, the target object information calculation unit 113 acquires target object information from the displayed information thus acquired. The flow then proceeds to step S361.

Then, in step S361, the master motion information acquiring unit 110 acquires master motion information. The flow then proceeds to step S362.

Then, in step S362, the master motion information correcting unit 133 generates corrected master motion information in accordance with the target object information acquired. The flow then proceeds to step S363.

Then, in step S363, the slave controller 116 generates a command value for the slave arm 3 in accordance with the corrected master motion information acquired from the master motion information correcting unit 133, and causes the slave arm 3 to shift and perform the task through the master input/output IF 118 and the master motor driver 119.

Effects of Seventh Embodiment

In addition to correction of force information on force to be fed back, master motion information is corrected by the master motion information correcting unit 133. This configuration is applicable also to a system that cannot correct force information. Furthermore, control of slave motion enables desired operation.

Either one of the master robot 102 or the slave robot 103 can include each constituent element in the control apparatuses according to the respective embodiments of the present disclosure.

Though the present disclosure has been described above based on the above first to seventh embodiments, the present disclosure should not be limited to the above-described first to seventh embodiments. For example, the present disclosure also includes the following cases.

Part or entirety of each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each of the control apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the control apparatus according to each of the above-mentioned embodiments is a following program. That is to say, this program has a computer execute the sections (parts/units) defined in claims. The program has a computer execute the units/steps defined in claims. That is, such a program is a control program for a master slave robot that includes a slave arm that performs an assembly task to a target object and a master arm manipulated by a person who remotely operates the slave arm, the person performing the assembly task using the master slave robot while watching a state of the assembly task imaged by an imaging device and displayed on a display unit, the program causing a computer to execute the steps of:

acquiring, by a force information acquiring unit, force information on force externally applied to the slave arm;

calculating, by a target object information calculation unit, target object information on a color depth of the target object of the assembly task at the display unit displaying the assembly task;

correcting, by a force information correcting unit, the force information acquired from the force information acquiring unit in accordance with the target object information acquired from the target object information acquiring unit, to generate corrected force information; and presenting to the master slave robot, by a force information presentation unit, the corrected force information generated by the force information correcting unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

INDUSTRIAL APPLICABILITY

The control apparatus and the control method for the master slave robot, the robot, the control program for the master slave robot, and the integrated electronic circuit for control of the master slave robot according to the present disclosure enable force presentation according to a picture watched by an operator, and are useful as a control apparatus and a control method for a master slave robot, a robot, a control program for the master slave robot, and an integrated electronic circuit for control of the master slave robot for industrial use, domestic use, medical use, or the like.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A control apparatus for a master slave robot that includes a slave arm and a master arm, wherein the master arm is to be manipulated by a person to remotely operate the slave arm to perform a task on a target object while watching a state of the task imaged by an imaging device and displayed on a display unit, the control apparatus comprising:
a force information acquiring unit that acquires force information indicative of a force externally applied to the slave arm;
a target object information calculation unit that calculates target object information by comparing a color depth of the target object displayed on the display unit to pre-stored color depths respectively associated with plural materials, determining a matching pre-stored color depth as being the pre-stored color depth that matches most closely with the color depth displayed on the display unit, and including information of the material associated with the matching pre-stored color depth in the target object information;
a force information correcting unit that corrects the force information acquired from the force information acquiring unit in accordance with the target object information calculated by the target object information calculation unit, to generate corrected force information; and
a force information presentation unit that applies a force to the master arm according to the corrected force information generated by the force information correcting unit.

2. The control apparatus for the master slave robot according to claim 1, wherein
the target object information calculation unit acquires imaged picture information at the display unit and calculates a color depth from the imaged picture information thus acquired.

3. The control apparatus for the master slave robot according to claim 2, wherein
the target object information calculation unit detects brightness from the imaged picture information at the display unit and calculates a color depth assuming that a color with smaller brightness is deeper and a color with larger brightness is lighter.

4. The control apparatus for the master slave robot according to claim 2, wherein
the target object information calculation unit converts the imaged picture information at the display unit into gray scale and calculates a color depth.

5. The control apparatus for the master slave robot according to claim 1, wherein
the force information correcting unit generates the corrected force information by correcting the force information acquired from the force information acquiring unit such that the force information is increased as the target object information on the color depth of the target object acquired from the target object information calculation unit indicates a deeper color.

6. The control apparatus for the master slave robot according to claim 1, further comprising:
a displayed information acquiring unit that acquires magnification percentage information on a picture at the display unit; wherein
the force information correcting unit increases a corrected amount for correction of the force information acquired from the force information acquiring unit as the magnification percentage information acquired from the displayed information acquiring unit is larger.

7. The control apparatus for the master slave robot according to claim 6, wherein
the displayed information acquiring unit calculates, as the magnification percentage information, a magnification percentage for enlarged display of a state of the task by the slave arm on a screen of the display unit, and the force information correcting unit corrects the force information in accordance with the calculated magnification percentage information.

8. The control apparatus for the master slave robot according to claim 1, wherein
the force information correcting unit corrects, when updating the force information in a predetermined period for correction of the force information, a period for updating the force information by extending or shortening the predetermined period.

9. The control apparatus for the master slave robot according to claim 1, wherein
the target object information calculation unit refers to correlation information between the task and a material of the target object or an assembling workload to the target object in accordance with identification information on the task, and calculates a material of the target object or an assembling workload to the target object.

10. The control apparatus for the master slave robot according to claim 2, wherein
the target object information calculation unit refers to correlation information between the task and a material of the target object or an assembling workload to the target object in accordance with identification information on the task, and calculates a material of the target object or an assembling workload to the target object.

11. The control apparatus for the master slave robot according to claim 3, wherein
the target object information calculation unit refers to correlation information between the task and a material of the target object or an assembling workload to the target object in accordance with identification information on the task, and calculates a material of the target object or an assembling workload to the target object.

12. The control apparatus for the master slave robot according to claim 4, wherein
the target object information calculation unit refers to correlation information between the task and a material of the target object or an assembling workload to the target object in accordance with identification information on the task, and calculates a material of the target object or an assembling workload to the target object.

13. A master slave robot comprising:
a slave robot comprising a slave arm and a control apparatus for the slave arm, the control apparatus for the slave arm controlling a position and an orientation of the slave arm, the slave arm having a hand that holds a target object; and
a master robot comprising a master arm and a control apparatus for the master arm, the control apparatus for the master arm generating motion of the slave arm and correcting force information acquired by the slave robot to present the corrected force information, wherein the master arm is to be manipulated by a person to remotely operate the slave arm to perform a task on the target object and holding the target object with the hand while watching a state of the assembly task imaged by an imaging device and displayed on a display unit, the control apparatus for the slave arm comprising:
- a force information acquiring unit that acquires force information indicative of a force externally applied to the slave arm, the control apparatus for the master arm comprising:
- a target object information calculation unit that calculates target object information by comparing a color depth of the target object displayed on the display unit to pre-stored color depths respectively associated with plural materials, determining a matching pre-stored color depth as being the pre-stored color depth that matches most closely with the color depth displayed on the display unit, and including information of the material associated with the matching pre-stored color depth in the target object information;
- a force information correcting unit that corrects the force information acquired from the force information acquiring unit in accordance with the target object information calculated by the target object information calculation unit, to generate corrected force information; and
- a force information presentation unit that applies a force to the master arm according to the corrected force information generated by the force information correcting unit.

14. A method of controlling a master slave robot that includes a slave arm and a master arm, wherein the master arm is to be manipulated by a person to remotely operate the slave arm to perform a task on a target object while watching a state of the task imaged by an imaging device and displayed on a display unit, the method comprising:
- acquiring, by a force information acquiring unit, force information indicative of a force externally applied to the slave arm;
- calculating, by a target object information calculation unit, target object information by comparing a color depth of the target object displayed on the display unit to pre-stored color depths respectively associated with plural materials, determining a matching pre-stored color depth as being the pre-stored color depth that matches most closely with the color depth displayed on the display unit, and including information of the material associated with the matching pre-stored color depth in the target object information;
- correcting, by a force information correcting unit, the force information acquired from the force information acquiring unit in accordance with the target object information acquired from the target object information calculation unit, to generate corrected force information; and
- applying, by a force information presentation unit, a force to the master arm according to the corrected force information generated by the force information correcting unit.

15. A computer-readable recording medium including a control program for a master slave robot that includes a slave arm and a master arm manipulated by a person who remotely operates the slave arm, the person performing the assembly task using the master slave robot while watching a state of the assembly task imaged by an imaging device and displayed on a display unit, the program causing a computer to execute the steps of:
- acquiring, by a force information acquiring unit, force information indicative of a force externally applied to the slave arm;
- calculating, by a target object information calculation unit, target object information by comparing a color depth of the target object displayed on the display unit to pre-stored color depths respectively associated with plural materials, determining a matching pre-stored color depth as being the pre-stored color depth that matches most closely with the color depth displayed on the display unit, and including information of the material associated with the matching pre-stored color depth in the target object information; correcting, by a force information correcting unit, the force information acquired from the force information acquiring unit in accordance with the target object information acquired from the target object information calculation unit, to generate corrected force information; and
- applying, by a force information presentation unit, a force to the master arm according to the corrected force information generated by the force information correcting unit.

\* \* \* \* \*